US012600136B2

(12) United States Patent
McAvoy

(10) Patent No.: US 12,600,136 B2
(45) Date of Patent: Apr. 14, 2026

(54) DROPLET EJECTOR ASSEMBLY STRUCTURE AND METHODS

(71) Applicant: 3C PROJECT TECHNOLOGIES LIMITED, Wicklow (IE)

(72) Inventor: Gregory John McAvoy, Lothian (GB)

(73) Assignee: 3C PROJECT TECHNOLOGIES LIMITED, Wicklow (IE)

( * ) Notice: Subject to any disclaimer, the term of this patent is extended or adjusted under 35 U.S.C. 154(b) by 521 days.

(21) Appl. No.: 17/925,151

(22) PCT Filed: May 13, 2021

(86) PCT No.: PCT/EP2021/062792

§ 371 (c)(1),
(2) Date: Nov. 14, 2022

(87) PCT Pub. No.: WO2021/229040

PCT Pub. Date: Nov. 18, 2021

(65) Prior Publication Data

US 2023/0182470 A1 Jun. 15, 2023

(30) Foreign Application Priority Data

May 15, 2020 (GB) ..................................... 2007236

(51) Int. Cl.
*B41J 2/045* (2006.01)
*B41J 2/14* (2006.01)
*B41J 2/16* (2006.01)

(52) U.S. Cl.
CPC ......... *B41J 2/1646* (2013.01); *B41J 2/04541* (2013.01); *B41J 2/04581* (2013.01);
(Continued)

(58) Field of Classification Search
CPC .................................................. B41J 2/14233
See application file for complete search history.

(56) References Cited

U.S. PATENT DOCUMENTS 6,283,579 B1 9/2001 Haga et al.
6,412,924 B1 7/2002 Ashe et al.
(Continued)

FOREIGN PATENT DOCUMENTS

CN 101048284 10/2007
CN 102036830 4/2011
(Continued)

OTHER PUBLICATIONS

Examination Report dated Aug. 19, 2024, issued for Chinese Application No. 202180035106.3 (24 pages).
(Continued)

*Primary Examiner* — Shelby L Fidler
(74) *Attorney, Agent, or Firm* — Nixon & Vanderhye P.C.

(57) ABSTRACT

A droplet ejector assembly for a printhead comprises a substrate, the substrate comprising a CMOS control circuit, a plurality of layers on the first surface of the substrate, a fluid chamber having a droplet ejection outlet, and a piezoelectric actuator element formed by one or more said layers and comprising first and second electrodes in contact with a piezoelectric body. The piezoelectric actuator element defines part of the fluid chamber. At least one said electrode electrically is connected to the CMOS control circuit. The droplet ejector comprises a fluid chamber having a droplet ejection outlet. The piezoelectric actuator element is separate to the droplet ejection outlet and the piezoelectric body is formed of one or more piezoelectric materials processable at a temperature below 450° C. Thus, a CMOS control circuit is integrated with a droplet ejector assembly. The CMOS control circuit may receive both an analogue actuator ejection pulse and serial digital controls signals and use the serial digital control signals to determine which piezoelectric actuator elements are connected to and driven by individual actuator ejection pulses.

23 Claims, 12 Drawing Sheets

(52) U.S. Cl.
CPC ....... *B41J 2/04588* (2013.01); *B41J 2/14233* (2013.01); *B41J 2202/13* (2013.01)

(56) References Cited

U.S. PATENT DOCUMENTS

| | | | |
|---|---|---|---|
| 6,536,682 | B1 | 3/2003 | Schnupp et al. |
| 8,789,932 | B2 | 7/2014 | Van Brocklin et al. |
| 10,870,276 | B2 | 12/2020 | McAvoy |
| 11,400,710 | B2 | 8/2022 | McAvoy |
| 2002/0047878 | A1 | 4/2002 | Akanabe et al. |
| 2004/0080574 | A1 | 4/2004 | Masumi |
| 2004/0130242 | A1 | 7/2004 | Buhler et al. |
| 2004/0251785 | A1 | 12/2004 | Takeuchi et al. |
| 2006/0098059 | A1 | 5/2006 | Ohguro et al. |
| 2007/0063615 | A1 | 3/2007 | Nihei |
| 2007/0080612 | A1 | 4/2007 | Terazono et al. |
| 2007/0159510 | A1 | 7/2007 | Hong et al. |
| 2007/0291083 | A1 | 12/2007 | Gyoutoku et al. |
| 2008/0018714 | A1 | 1/2008 | Domoto et al. |
| 2011/0032311 | A1 | 2/2011 | Miyazawa |
| 2011/0109701 | A1 | 5/2011 | Ohashi |
| 2011/0216129 | A1 | 9/2011 | Kusunoki et al. |
| 2012/0056947 | A1 | 3/2012 | Tanuma et al. |
| 2012/0069101 | A1 | 3/2012 | Kato et al. |
| 2012/0304776 | A1 | 12/2012 | Novotny |
| 2013/0027477 | A1 | 1/2013 | Guan et al. |
| 2013/0050354 | A1 | 2/2013 | Kato et al. |
| 2013/0063522 | A1 | 3/2013 | Arai et al. |
| 2013/0070027 | A1 | 3/2013 | Arai et al. |
| 2013/0070030 | A1 | 3/2013 | Kusonoki et al. |
| 2013/0100211 | A1 | 4/2013 | Kawakubo et al. |
| 2013/0106961 | A1* | 5/2013 | Van Brocklin ..... H01L 21/7624 438/21 |
| 2013/0222481 | A1 | 8/2013 | Yokoyama et al. |
| 2013/0235123 | A1 | 9/2013 | Yokoyama et al. |
| 2013/0271530 | A1 | 10/2013 | Yokoyama et al. |
| 2014/0035439 | A1 | 2/2014 | Kurachi et al. |
| 2014/0035440 | A1 | 2/2014 | Aida et al. |
| 2014/0063095 | A1 | 3/2014 | Yokoyama et al. |
| 2014/0063130 | A1 | 3/2014 | Arai et al. |
| 2014/0063131 | A1 | 3/2014 | Arai et al. |
| 2014/0071204 | A1 | 3/2014 | Kusunoki et al. |
| 2014/0084749 | A1 | 3/2014 | Sakuma et al. |
| 2014/0267498 | A1 | 9/2014 | Yokoyama et al. |
| 2014/0267499 | A1 | 9/2014 | Kato |
| 2014/0322523 | A1 | 10/2014 | Abbott, Jr. et al. |
| 2015/0002587 | A1 | 1/2015 | Yokoyama et al. |
| 2015/0010867 | A1 | 1/2015 | Ohki et al. |
| 2015/0054387 | A1 | 2/2015 | Li |
| 2015/0174910 | A1 | 6/2015 | Kaneko |
| 2015/0228885 | A1 | 8/2015 | Abbott, Jr. et al. |
| 2015/0228886 | A1 | 8/2015 | Abbott, Jr. et al. |
| 2016/0052272 | A1 | 2/2016 | Kawakubo et al. |
| 2016/0059547 | A1 | 3/2016 | Kaneko |
| 2016/0059564 | A1 | 3/2016 | Ohtsu et al. |
| 2016/0279933 | A1 | 9/2016 | Arai et al. |
| 2016/0279942 | A1 | 9/2016 | Kusunoki et al. |
| 2017/0008286 | A1 | 1/2017 | Satomi |
| 2017/0151778 | A1 | 6/2017 | Nitta et al. |
| 2017/0203560 | A1 | 7/2017 | Nitta et al. |
| 2017/0313075 | A1 | 11/2017 | Arai et al. |
| 2018/0001640 | A1 | 1/2018 | Eid et al. |
| 2018/0037023 | A1 | 2/2018 | Kusunoki et al. |
| 2018/0072055 | A1 | 3/2018 | Kiji |
| 2018/0085745 | A1 | 3/2018 | Yokoyama et al. |
| 2018/0085746 | A1 | 3/2018 | Yokoyama et al. |
| 2018/0085757 | A1 | 3/2018 | Yokoyama et al. |
| 2018/0086077 | A1 | 3/2018 | Yokoyama et al. |
| 2018/0154635 | A1* | 6/2018 | Nakakubo .............. B41J 2/1639 |
| 2018/0169649 | A1 | 6/2018 | Yokoyama et al. |
| 2018/0194134 | A1 | 7/2018 | Kawakubo et al. |
| 2018/0326727 | A1 | 11/2018 | Mawatari et al. |
| 2019/0060935 | A1 | 2/2019 | Yokoyama et al. |
| 2019/0060937 | A1 | 2/2019 | Yokoyama et al. |
| 2019/0061342 | A1 | 2/2019 | Yokoyama et al. |
| 2019/0077153 | A1 | 3/2019 | Seki |
| 2019/0077154 | A1 | 3/2019 | Seki |
| 2019/0077155 | A1 | 3/2019 | Seki |
| 2019/0118532 | A1 | 4/2019 | Seki |
| 2019/0193396 | A1 | 6/2019 | Ohtsu |
| 2019/0210365 | A1 | 7/2019 | Takamura |
| 2019/0232657 | A1 | 8/2019 | Takabe |
| 2019/0283424 | A1 | 9/2019 | McAvoy |
| 2019/0315122 | A1 | 10/2019 | Yokoyama et al. |
| 2019/0315139 | A1 | 10/2019 | Yamamoto et al. |
| 2019/0358954 | A1 | 11/2019 | Seki |
| 2019/0358955 | A1 | 11/2019 | Giusti et al. |
| 2020/0047178 | A1 | 2/2020 | Yokoyama et al. |

FOREIGN PATENT DOCUMENTS

| | | | |
|---|---|---|---|
| CN | 102712197 | 10/2012 | |
| CN | 108472958 | 8/2018 | |
| EP | 3 246 163 | 11/2017 | |
| EP | 3 246 164 | 11/2017 | |
| JP | H 0786656 | 3/1995 | |
| JP | 2001-284670 | 10/2001 | |
| JP | 2004-050526 | 2/2004 | |
| JP | 2004-209733 | 7/2004 | |
| JP | 2010005900 A * | 1/2010 | |
| JP | 2011-187790 | 9/2011 | |
| JP | 2012-61611 | 3/2012 | |
| JP | 2013-86287 | 5/2013 | |
| JP | 2013-527062 | 6/2013 | |
| JP | 2019-530601 | 10/2019 | |
| JP | 2019-195922 | 11/2019 | |
| JP | 2019-217789 | 12/2019 | |
| WO | 2011/149469 | 12/2011 | |
| WO | 2018/054917 | 3/2018 | |
| WO | WO-2018054917 A1 * | 3/2018 | ............ B41J 2/1642 |

OTHER PUBLICATIONS

International Search Report and Written Opinion issued in PCT/EP2021/062792, dated Aug. 8, 2021.

Office Action dated Mar. 31, 2025 issued for Chinese Application No. 202180035106.3 and Translation (24 pages).

Notice of Refusal dated Oct. 14, 2025, issued for Japanese Application No. 2022-569075 (7 pages) and Translation (8 pages).

* cited by examiner

DROPLET EJECTOR ASSEMBLY STRUCTURE AND METHODS

This application is the U.S. national phase of International Application No. PCT/EP2021/062792 filed May 13, 2021 which designated the U.S. and claims priority to GB 2007236.9 filed May 15, 2020, the entire contents of each of which are hereby incorporated by reference.

FIELD OF THE INVENTION

The invention relates to the field of droplet ejector assemblies for applications such as inkjet printheads, additive manufacturing and fluid dispensing printheads, which employ piezoelectric actuators.

BACKGROUND TO THE INVENTION

In order to maximise resolution, piezoelectric inkjet printheads seek to provide a relatively high density of individually controllable actuators configured to selectively eject a liquid through respective nozzles. In order to provide the required resolution, commercially available high-density piezoelectric inkjet printheads generally comprise a printhead control circuit which is separate to the droplet ejector assembly or assemblies and have large numbers of electrical connections to the droplet ejector assembly or assemblies in order to control the numerous actuators. For example, high density printheads from Fuji®, Ricoh® or Epson® currently employ a head drive integrated circuit and a flexible assembly on a film connected to the printhead through many parallel electrical connections to drive individual piezoelectric actuators within the printhead.

It would be advantageous to reduce the number of individual wired connections to an inkjet printhead in order to simplify manufacture, improve configurability and improve reliability. This might be achieved by integrating a control circuit, embedded in integrated circuit substrates, with the piezoelectric actuators. However, there is a problem, in that CMOS drive circuits are incompatible with industry standard piezoelectric actuators due at least to the (peak) temperatures required during manufacture.

In more detail, at the present time, piezoelectric actuators for inkjet printheads are generally formed of Lead Zirconate Titanate (PZT). PZT has a high magnitude piezoelectric constant (>100) which is advantageous. PZT requires processing at a temperature which would damage CMOS devices. For example, PZT may be deposited by physical vapour deposition but this requires subsequent annealing and/or poling steps at a temperature of greater than 450° C., or it may be deposited by a sol gel method, but with a high temperature (greater than 600° C.) annealing step. There are numerous problems associated with processing CMOS at high temperatures include the degradation of dopant mobility and interconnect wiring schemes. CMOS electronics are known to survive temperatures of 450° C. A much lower temperature (i.e. below 300° C.) is desirable for high yield.

Deposited PZT and other piezo materials often also require a poling step-which essentially involves exposing the piezo material to very high electric field to orient the crystals. The poling step is also not CMOS compatible.

It is not possible to manufacture a PZT actuator and then manufacture a CMOS circuit integrated thereon because lead is not allowed into CMOS manufacturing foundries.

Accordingly, PZT piezoelectric materials are not CMOS-compatible and cannot be formed integrally with CMOS control circuits. PZT has not been replaceable with an alternative material because alternative known piezoelectric materials have much lower magnitude piezoelectric constants.

Accordingly, the invention seeks to improve the integration of piezoelectric droplet ejector assemblies and in some embodiments to improve the density of droplet ejectors within a printhead.

WO 2018054917 (McAvoy) proposed a droplet ejector assembly in which a substrate with CMOS devices is integrated with an actuator formed of a piezoelectric material which is processable at a temperature below 450° C. and which is CMOS-compatible, but this was only possible because of the novel design of the actuator, where the substrate was integrated with a nozzle-forming layer, with the piezoelectric actuator located on a nozzle-portion of the nozzle-forming layer. This actuator configuration, which differs from typical configurations in which the nozzle is located in a wall of a fluid chamber which is opposite the actuator, substantially improves droplet ejection efficiency over other device configurations and allows the use of a piezoelectric material other than PZT despite a reduction in piezoelectric coefficient of at least one and potentially two orders of magnitude.

SUMMARY OF THE INVENTION

In a first aspect, the invention provides a droplet ejector assembly for a printhead, the droplet ejector assembly comprising: a substrate having a first surface and an opposite second surface, the substrate comprising a CMOS control circuit, a plurality of layers on the first surface of the substrate, a fluid chamber having a droplet ejection outlet, and a piezoelectric actuator element (which is deformable in use) formed by one or more said layers and comprising a piezoelectric body and first and second electrodes in contact with the piezoelectric body, the piezoelectric actuator element defining part of the fluid chamber (e.g. a wall thereof).

Typically, at least one said electrode is (and optionally the first and second electrodes are) electrically connected to the CMOS control circuit. The CMOS control circuit May comprise or be a CMOS actuator control circuit configured to control the actuator of the piezoelectric actuator.

It may be that the piezoelectric body is formed of one or more piezoelectric materials processable at a temperature below 450° C.

Typically, the piezoelectric actuator element is separate to the droplet ejection outlet. We have found that surprisingly it is possible for efficient droplet ejector assemblies to be built using materials other than PZT without requiring a structure in which the droplet ejection outlet is part of (typically an aperture through) the piezoelectric actuator element.

Nevertheless in some embodiments, the droplet ejection outlet may be part of or separate to the piezoelectric actuator element.

In a second aspect, the invention provides an inkjet printer comprising a controller and one or more droplet ejector assemblies according to the first aspect in electronic communication with and controlled by the controller. The said controller may be a print controller. The controller may comprise one or more microcontrollers or microprocessors, which may be integrated or distributed, in communication with or comprising a memory storing program code. The inkjet printer may comprise one or more further controllers.

The invention extends in a third aspect to a method of operating a droplet ejector assembly according to the first aspect, or an inkjet printer according to the second aspect, wherein the CMOS control circuit receives digital actuation control signals (through at least one input, typically from the said controller) and processes the digital actuation control signals to selectively actuate the piezoelectric actuator element to cause droplet ejection.

Typically, the CMOS control circuit is formed on the first surface of the substrate. Typically, the CMOS control circuit comprises at least one CMOS transistor on the first surface of the substrate. Typically, the CMOS control circuit comprises at least one CMOS transistor on the first surface of the substrate which is electrically connected to the first or second electrode without a further intervening semiconductor junction.

Above 300° C., the manufacture of integrated electronic components (e.g. CMOS electronic components) typically begin to degrade, impairing device operation and reducing efficiency. Above 450° C., integrated electronic components (e.g. CMOS electronic components) typically degrade even more substantially. Use of piezoelectric materials processable at a temperature below 450° C. therefore permits processing of, and integration of, the piezoelectric actuator with the CMOS control circuit without substantial damage to the said CMOS control circuit.

It may be that the piezoelectric body comprises (e.g. is formed from) one or more piezoelectric materials processable at a temperature below 300° C. Use of piezoelectric materials processable at a temperature below 300° C. permits processing of, and integration of, the piezoelectric actuator with the CMOS control circuit with even less damage to the CMOS control circuit than processing at a temperature of up to 450° C. Use of piezoelectric materials processable at a temperature below 300° C. permits a higher yield of functioning devices to be achieved from large-scale manufacture of multiple fluid ejectors on a single substrate (e.g. from a single substrate wafer).

By integrating the piezoelectric actuator with the CMOS control circuit, the need to provide separate droplet ejector drive electronics (typically provided as a separate component to the fluidic/actuator/nozzle piezoelectric printhead assembly in existing devices) is reduced or removed. This removes the requirement for large amounts of external connections and thus facilitates increasing the nozzle count per assembly, reducing the overall printhead size, and permitting a higher printhead nozzle density than is achievable with existing piezoelectric printheads. Other benefits associated with integration on a single printhead assembly include manufacturing cost reductions, modularity and device reliability.

Piezoelectric materials which are processable below 450° C. (or below 300° C.) typically have poorer piezoelectric properties (e.g. lower piezoelectric constants) than piezoelectric materials which require processing at higher temperatures. For example, a piezoelectric actuator formed from a high-temperature processable piezoelectric material such as lead zirconate titanate (PZT) is able to exert a force over an order of magnitude greater than a piezoelectric actuator formed from a low-temperature processable piezoelectric material such as aluminium nitride (AlN), all other factors being equal.

A piezoelectric material processable at a temperature below 450° C. (or below 300° C.) is typically a piezoelectric material which is depositable at a temperature below 450° C. (or below 300° C.). A piezoelectric material processable at a temperature below 450° C. (or below 300° C.) does not typically require any post-deposition processing (such as post-deposition annealing) at a temperature at or above 450° C. (or at or above 300° C.). A piezoelectric material processable at a temperature below 450° C. (or below 300° C.) is therefore typically a piezoelectric material which is annealable (after deposition) at a temperature below 450° C. (or below 300° C.) (i.e. if annealing of the piezoelectric material is required to render the piezoelectric body piezoelectric).

The one or more piezoelectric materials are typically processable (e.g. depositable and, if required, annealable) at a temperature below 450° C. (or below 300° C.) such that the piezoelectric actuator is manufacturable at a temperature below 450° C. (or below 300° C.). Manufacture of the piezoelectric actuator at a temperature below 450° C. (or below 300° C.) permits integration of the piezoelectric actuator with CMOS control circuit integrated with the substrate.

The piezoelectric body is therefore typically formable (e.g. by deposition and, if required, annealing of the one or more piezoelectric materials) at a temperature below 450° C. (or below 300° C.).

The one or more piezoelectric materials are typically processable (e.g. depositable and, if required, annealable) at a substrate temperature below 450° C. (or below 300° C.). In other words, the temperature of the substrate does not typically reach or exceed 450° C. (or 300° C.) during processing (e.g. deposition and, if required, annealing) of the one or more piezoelectric materials. The temperature of the substrate does not typically reach or exceed 450° C. (or 300° C.) during formation of the piezoelectric body. The temperature of the substrate does not typically reach or exceed 450° C. (or 300° C.) during manufacture of the piezoelectric actuator. It may be that the temperature of the substrate does not reach or exceed 450° C. (or 300° C.) during manufacture of the (e.g. entire) droplet ejector assembly.

The piezoelectric body is typically depositable (e.g. deposited) by one or more (e.g. low-temperature) physical vapour deposition (PVD) methods. The piezoelectric body is typically depositable (e.g. deposited) by one or more (e.g. low-temperature) physical vapour deposition methods at a temperature (i.e. at a substrate temperature) below 450° C. (or more preferably below 300° C.).

26 It may be that the piezoelectric body comprises (e.g. is formed from) one or more (e.g. low-temperature) PVD-depositable piezoelectric materials. It may be that the piezoelectric body comprises (e.g. is formed from) one or more (e.g. low-temperature) PVD-deposited piezoelectric materials.

Physical vapour deposition methods (e.g. low-temperature physical vapour deposition methods) may comprise one or more of the following deposition methods: cathodic arc deposition, electron beam physical vapour deposition, evaporative deposition, pulsed laser deposition, sputter deposition. Sputter deposition may comprise sputtering of material from single or multiple sputtering targets.

The one or more piezoelectric materials typically have deposition temperatures below 450° C. (or below 300° C.). The one or more piezoelectric materials may have PVD-deposition temperatures below 450° C. (or below 300° C.). The one or more piezoelectric materials may have sputtering temperatures below 450° C. (or below 300° C.). The one or more piezoelectric materials may have post-deposition annealing temperatures below 450° C. (or below 300° C.). It will be understood that the deposition temperature, the PVD-deposition temperature, the sputtering temperature or the annealing temperature is typically the temperature of the substrate during the respective process.

The piezoelectric body may comprise (e.g. be formed from) one piezoelectric material. Alternatively, the piezoelectric body may comprise (e.g. be formed from) more than one 11 piezoelectric material.

The piezoelectric body typically has a piezoelectric constant $d_{31}$ having a magnitude less than 30 pC/N, or more typically less than 20 pC/N, or even more typically less than 10 pC/N. The one or more piezoelectric materials typically have piezoelectric constants $d_{31}$ having magnitudes less than 30 pC/N, or more typically less than 20 pC/N, or even more typically less than 10 pC/N.

The one or more piezoelectric materials are typically CMOS-compatible. By this, it will be understood that the one or more piezoelectric materials do not typically comprise, or are typically processable (e.g. depositable, and if required, annealable) without use of, substances which damage CMOS electronic structures. For example, processing (e.g. deposition, and if required, annealing) of the one or more piezoelectric materials does not typically include use of (e.g. strong) acids (such as hydrochloric acid) and/or (e.g. strong) alkalis (such as potassium hydroxide), or other materials which May damage/are disallowed in CMOS foundries.

Thus, the piezoelectric body is not formed of, and typically does not comprise, PZT. This is highly advantageous as the lead in PZT is environmentally damaging.

The piezoelectric body may comprise (e.g. be formed from) a ceramic material comprising aluminium and nitrogen and optionally one or more elements selected from: scandium, yttrium, titanium, magnesium, hafnium, zirconium, tin, chromium, boron.

The piezoelectric body may comprise (e.g. be formed from) aluminium nitride (AlN).

The piezoelectric body may comprise (e.g. be formed from) zinc oxide (ZnO).

The one or more piezoelectric materials may comprise (e.g. consist of) aluminium nitride and/or zinc oxide.

Aluminium nitride may consist of pure aluminium nitride. Alternatively, aluminium nitride may comprise one or more elements (i.e. aluminium nitride may comprise aluminium nitride compounds). Aluminium nitride may comprise one or more of the following elements: scandium, yttrium, titanium, magnesium, hafnium, zirconium, tin, chromium, boron.

The piezoelectric body may comprise (e.g. be formed from) scandium aluminium nitride (ScAlN). The percentage of scandium in scandium aluminium nitride is typically chosen to optimize the $d_{31}$ piezoelectric constant within the limits of manufacturability. For example, the value of x in $Sc_xAl_{1-x}N$ is typically chosen from the range $0<x\leq 0.5$. Greater fractions of scandium typically result in larger values of $d_{31}$ (i.e. stronger piezoelectric effects). The mass percentage (i.e. the weight percentage) of scandium in scandium aluminium nitride is typically greater than 5%. The mass percentage (i.e. the weight percentage) of scandium in scandium aluminium nitride is typically greater than 10%. The mass percentage (i.e. the weight percentage) of scandium in scandium aluminium nitride is typically greater than 20%. The mass percentage (i.e. the weight percentage) of scandium in scandium aluminium nitride is typically greater than 30%. The mass percentage (i.e. the weight percentage) of scandium in scandium aluminium nitride is typically greater than 40%. The mass percentage (i.e. the weight percentage) of scandium in scandium aluminium nitride may be less than or equal to 50%.

Aluminium nitride, including aluminium nitride compounds (and in particular scandium aluminium nitride), and zinc oxide are piezoelectric materials which may be deposited below 450° C., or more preferably below 300° C. Aluminium nitride, including aluminium nitride compounds (and in particular scandium aluminium nitride), and zinc oxide are piezoelectric materials which may be deposited by physical vapour deposition (e.g. sputtering) below 450° C., or more preferably below 300° C. Aluminium nitride, including aluminium nitride compounds (and in particular scandium aluminium nitride), and zinc oxide are piezoelectric materials which do not typically require annealing after deposition.

The piezoelectric body may comprise (e.g. be formed from) aluminium nitride (e.g. aluminium nitride compounds, for example scandium aluminium nitride) and/or zinc oxide deposited by physical vapour deposition below 450° C., or more preferably below 300° C.

The piezoelectric body may comprise (e.g. be formed from) one or more III-V and/or II-VI semiconductors (i.e. compound semiconductors comprising elements from Groups III and V and/or Groups II and VI of the Periodic Table). Such III-V and II-VI semiconductors typically crystallise in the hexagonal wurtzite crystal structure. III-V and II-VI semiconductors crystallising in the hexagonal wurtzite crystal structure are typically piezoelectric due to their non-centrosymmetric crystal structure.

It may be that the piezoelectric body comprises (e.g. is formed from or consists of) one or more non-ferroelectric piezoelectric materials.

The one or more piezoelectric materials may each be non-ferroelectric piezoelectric materials. Examples of non-ferroelectric piezoelectric materials include, for example, aluminium nitride, scandium aluminium nitride and zinc oxide.

Advantageously, non-ferroelectric piezoelectric materials typically do not require poling. It may be that the manufacture of the droplet ejector assembly does not include poling. Generally non-ferroelectric piezoelectric materials do not have piezoelectric constants with a magnitude comparable to that of PZT. For example, ZnO, AlN and ScAlN, which are non-ferroelectric piezoelectric materials have piezoelectric constants, $d_{31}$, of −3.3, −1.9 and −5.8 versus −10 to −260 for PZT.

It may be that the CMOS control circuit is configured to actuate the piezoelectric body by applying an electrical potential gradient to the piezoelectric body in a first direction to cause the piezoelectric body to flex in a first sense and then to apply an electrical potential gradient to the piezoelectric body in the opposite direction to cause it to deform in an opposite second sense.

The electrical potential gradient is applied by regulating the voltages applied to the first and/or second electrodes. (One electrode may remain at ground in which case only the voltage applied to the other electrode need be regulated).

By applying an electrical potential gradient to the piezoelectric body in a first direction to cause the piezoelectric body to flex in a first sense and then applying an electrical potential gradient to the piezoelectric body in the opposite direction to cause it to deform in an opposite second sense, the actuator may act as a push-pull actuator and readily implement both draw and dispense portions of an ejection cycle. This is not possible with ferroelectric materials such as PZT.

Furthermore a larger deflection is possible from deformation in a first direction to deformation in the other direction. This can compensate for the reduced piezoelectric constant in comparison with ferroelectric materials such as PZT.

It may be that in a default configuration in which no electrical potential gradient is applied, the piezoelectric body is planar and when flexed in the first and second senses respectively the surface of the piezoelectric body closest to the fluid chamber is concave and convex respectively, or vice versa.

It is advantageous to enable the piezoelectric body to be actuated to both concave and convex configurations during an actuation cycle while remaining planar when no electrical potential gradient is applied, as the default planar configuration may enhance the longevity of the device. This contrasts with known push-pull piezoelectric actuators with ferroelectric piezoelectric bodies formed of PZT which require a potential difference to be continually applied to maintain the piezoelectric body in a deformed configuration between actuation cycles or require a DC voltage for a predetermined period prior to commencing an actuation cycle.

It may be that the piezoelectric body has a relative permittivity, $\varepsilon_r$, of less than 100.

This contrasts with the use of piezoelectric bodies formed with PZT which have a relative permittivity, $\varepsilon_r$, which is much greater than 100 and, with some compositions, is greater than 1000. Capacitance between electrodes is a function of (proportional to, in the case of parallel plate capacitors) the relative permittivity, $\varepsilon_r$, of the intervening dielectric. The capacitance of the piezoelectric bodies affects their power consumption, and by using a material with a relatively low permittivity (in comparison with corresponding devices using PZT), the piezoelectric bodies have a relatively low capacitance (in comparison with corresponding devices using PZT) enabling reduced power consumption and/or greater nozzle density.

It may be that the piezoelectric body has a breakdown voltage of greater than 100V/μm.

By selecting a piezoelectric material with a breakdown voltage of greater than 100V/μm, a greater actuation force can be applied than would be the case with PZT which has a breakdown voltage of around 50V/μm.

Typically, the CMOS control circuit is configured to apply a potential gradient of greater than 100V/μm within (e.g. across, depending on structure) the piezoelectric body. The CMOS control circuit may be configured to apply a potential gradient of greater than 100V/μm within (e.g. across, depending on structure) the piezoelectric body in a first direction and then a potential gradient of greater than 100V/μm within (e.g. across, depending on structure) the piezoelectric body in the opposite direction.

The method may comprise applying potentials to the first and second electrodes to generate a potential gradient of greater than 100V/μm within (e.g. across, depending on structure) the piezoelectric body. The method may comprise applying potentials to the first and second electrodes to generate a potential gradient of greater than 100V μm within (e.g. across, depending on structure) the piezoelectric body in a first direction and then a potential gradient of greater than 100V/μm within (e.g. across, depending on structure) the piezoelectric body in the opposite direction.

The use of a piezoelectric material with a breakdown voltage of greater than 100V/μm can enable the reduced actuator force when compared with PZT to be offset.

It may be that the CMOS control circuit comprises (a) a digital register. It may be that the CMOS control circuit comprises (b) a nozzle trimming calculation circuit and/or register. It may be that the CMOS control circuit comprises (c) a temperature measurement circuit. It may be that the CMOS control circuit comprises (d) a fluid chamber fill detection circuit.

The digital register may be a shift register, or a latch register, for example. The method may comprise storing data in or reading data from a register within the CMOS control circuit. The method may comprise measuring temperature using a temperature sensitive component of the CMOS measurement circuit. The method may comprise measuring the fill level of a fluid chamber.

It may be that the CMOS control circuit is configured to modify the voltage pulses applied to one or more electrodes of one or more piezoelectric actuators responsive to data stored by the CMOS control circuit or measurements from one or more sensors, which are typically within the droplet ejector assembly. The method may comprise the CMOS control circuit modifying the voltage pulses applied to one or more electrodes of one or more piezoelectric actuators responsive to data stored by the CMOS control circuit or measurements from one or more sensors, which are typically within the droplet ejector assembly.

Modifying the voltage pulses may comprise shifting them in time. Modifying the voltage pulses may comprise compressing or expanding them. Modifying the voltage pulses may comprise modifying their magnitude. Modifying the voltage pulses may comprise swapping between a plurality of (typically repeating) sequences of received actuator drive pulses with different profiles. The CMOS control circuit is typically configured to modify, and the method typically comprising modifying, the voltage pulses applied to one or more electrodes of one or more individual piezoelectric actuators responsive to data relating to that individual piezoelectric actuator stored by the CMOS control circuit or measurements from one or more sensors.

It may be that the CMOS control circuit comprises an ejection transistor. The ejection transistor is typically in direct electrical communication (without intervening switched semiconductor junction) with an electrode of the piezoelectric actuator. The method may comprise controlling the ejection transistor to cause a potential output from the ejection transistor to be applied directly to an electrode of the piezoelectric actuator.

It may be that the droplet ejector assembly comprises a plurality of said fluid chambers having respective droplet ejection outlets, and a plurality of said piezoelectric actuator elements formed by one or more layers on the first surface of the substrate and each piezoelectric actuator comprising a piezoelectric body and first and second electrodes in contact with the piezoelectric body, each piezoelectric actuator element defining part of a respective fluid chamber. Thus the droplet ejector assembly may comprise a plurality of independently actuatable droplet ejectors. Typically the CMOS control circuit controls the plurality of piezoelectric actuator elements. Again it may be that each droplet ejection outlet is separate to the piezoelectric actuator element. Each fluid chamber, piezoelectric actuator element and piezoelectric body may be as set out herein.

It may be that the droplet ejector assembly comprises an electrical input for receiving actuator drive pulses. The method may comprise the step of receiving actuator drive pulses.

It may be that the controller comprises a pulse generator configured to generate (typically a sequence of) actuator drive pulses. The droplet ejector assembly typically comprises an electrical input connected to the controller through which the actuator drive pulses are received. The method may comprise the step of generating actuator drive pulses (e.g. in a controller) and conducting them to the droplet ejector assembly through an electrical connection.

The actuator drive pulses are typically analogue signals. The actuator drive pulses typically comprise periodic repeating voltage waveforms.

It may be that the CMOS control circuits are configured to switchedly connect or disconnect at least one electrode of the or each of a plurality of piezoelectric actuators to the received actuator drive pulses to thereby selectively actuate the piezoelectric actuators. The method may comprise switchedly connecting or disconnecting at least one electrode of the or each of a plurality of piezoelectric actuators to the received actuator drive pulses to thereby selectively actuate the piezoelectric actuators.

It may be that the controller comprises one or more pulse generators which generate a plurality of sequences of actuator drive pulses, and electrical inputs of the droplet ejector assembly receive the plurality of sequences of actuator drive pulses (generated by the one or more pulse generators) through a plurality of electrical connections to the controller, and the CMOS control circuits are configured to switchedly connect or disconnect at least one electrode of the or each of a plurality of piezoelectric actuators to received actuator drive pulses selected from a plurality of different received sequences of actuator pulses. It may be that the method comprises generating a plurality of different sequences of actuator drive pulses (e.g. in a controller) and conducting them to the droplet ejector assembly through separate electrical connections, and switchedly connecting or disconnecting at least one electrode of the or each of a plurality of piezoelectric actuators to one or more received actuator drive pulses received from a variable (and selectable) one of the plurality of different sequences of actuator drive pulses.

The selection as to which received sequence of actuator pulses at least one electrode of piezoelectric actuator is connected to may be responsive to stored data specific to the respective piezoelectric actuator and/or responsive to measurements of operation of the respective piezoelectric actuator. Accordingly, the CMOS control circuits can typically select, and the method typically comprises selecting, whether or not each piezoelectric actuator ejects a droplet at each of a sequence of periodic droplet ejection decision points. By a decision point we refer to a time prior to the start of an actuator drive pulses where it is determined whether or not to communicate that actuator drive pulse to at least one electrode of a specific piezoelectric actuator. In some embodiments the CMOS control circuits can also select, and the method typically comprises selecting, which actuator pulse, from amongst a plurality of actuator pulses, (from the same or different streams of actuator pulses) is applied to at least one electrode of a respective piezoelectric actuator at each said droplet ejection decision point.

Typically the actuator drive pulses repeat periodically. It may be that the actuator drive pulses are amplified by the controller. It may be that the actuator drive pulses are not amplified by the droplet ejector assembly. It may be that the droplet ejector assembly does not generate actuator drive pulses.

Typically pulses from the pulse generator are conducted to a plurality of control circuits, which may be part of a plurality of droplet ejector assemblies. Thus a single pulse generator circuit may drive multiple piezoelectric transducers on the same substrate and/or multiple droplet ejector assemblies having separate substrates, each having multiple piezoelectric transducers.

The digital actuation control signals are typically received from a controller. The digital actuation control signals are typically received through a flexible connector. The digital actuation control signals may be received in serial form and converted to parallel control signals using a shift register within the CMOS control circuit.

It may be that the controller comprises a pulse generator configured to generate actuator drive pulses which are conducted to the droplet ejector assembly (or a plurality of droplet ejector assemblies) and digital control signals which are conducted to the droplet ejector assembly (or a plurality of droplet ejector assemblies) and the digital control signals are processed in the CMOS control circuit(s) of the droplet ejector assembly(s) to determine which actuator drive pulses are conducted to at least one electrode of the piezoelectric actuator or piezoelectric actuators of the one or more droplet ejector assemblies to cause droplet ejection.

The method may comprise generating actuator drive pulses (e.g. at a controller) and digital control signals, and conducting both the actuator drive pulses and the digital control signals to the CMOS control circuit(s) of the droplet ejector assembly(s) and the CMOS control circuit(s) processing the digital control signals and, responsive thereto, conducting selected actuator drive pulses to at least one electrode of the piezoelectric actuator or piezoelectric actuator of the one or more droplet ejector assemblies to cause droplet ejection.

Thus, typically analogue actuator drive pulse and digital control signals are input by the CMOS control circuit (and typically by the droplet ejector assembly). Typically the digital control signals are used to selectively switch the analogue actuator drive pulses to thereby selectively transmit them to the piezoelectric actuators.

This enables increased voltages to be managed, offsetting the limitations of piezoelectric materials other than PZT and/or non-ferromagnetic piezoelectric materials.

In some embodiments, the CMOS control circuit is configured to switchedly connect, and the method may comprise switchedly connecting, one or more of ground and a single fixed non-zero voltage line, or multiple fixed voltage lines of different voltages (one or more of which may be ground) to one or both electrodes of a piezoelectric actuator to cause droplet ejection. For example, the CMOS control circuit may switch, and the method may comprise switching an electrode between a connection to ground and a connection to a fixed voltage or multiple fixed voltage lines of different voltages and back to ground again in order to cause a droplet ejection.

Switching an electrode between a connection to ground and a connection to a fixed voltage or between fixed voltage lines may comprise operating a latch.

It may be that the CMOS control circuit is configured to individually and selectively actuate at least three (or at least four) said piezoelectric actuator elements formed by one or more said layers on the same substrate and defining part of different respective fluid chambers (with different respective droplet ejection outlets), optionally wherein the said at least three (or at least four) actuator elements are configured for ejecting fluid of different colours or compositions or as redundant droplet ejection outlets.

It may be that the said at least three (or at least four) piezoelectric actuator elements are located on the substrate (optionally adjacent each other, optionally in a row) and the CMOS control circuit is connected to a flexible printhead cable having one or more electrical signal conductors, wherein the CMOS control circuit is configured to individually and selectively actuate the actuator elements of the at least three (or at least four) piezoelectric actuator elements responsive to actuation commands received through the same signal conductor.

Thus, due to the integration of the CMOS control circuit which is configured to drive at least three (or at least four) actuator elements, an individual signal conductor May transmit a control signal leading to the actuation of individual actuator elements of the at least three (or at least four) piezoelectric actuator elements. Typically the control signals are digital control signals.

The at least three (or at least four) piezoelectric actuator elements may comprise or are a group of piezoelectric actuator elements, for example a group of piezoelectric actuator elements which are configured to eject fluid of the same colour or composition (for example have fluid chambers in fluid communication with the same fluid supply), or fluid of different colours or compositions (for example have fluid chambers in fluid communication with separate fluid supplies), or a group of piezoelectric actuator elements which are divided into a plurality of (typically at least three or at least four) sub-groups, wherein the piezoelectric actuator elements in each sub-group are configured to eject fluid of the same colour or composition (for example have fluid chambers in fluid communication with the same fluid supply) and the piezoelectric actuator elements of some or all of the sub-groups are configured to eject fluid of different colours or compositions (for example are in fluid communication with separate fluid supplies). Piezoelectric actuator elements in the same sub-group may be arranged in an array and there may be a plurality of arrays for respective sub-groups.

It may be that the CMOS control circuit is configured to individually and selectively actuate at least double the number of piezoelectric actuator elements than signal conductors through which the CMOS control circuit receives actuation control signals.

It may be that the said CMOS control circuit is configured to individually and selectively actuate at least 128 (or at least 256) piezoelectric actuator elements and the CMOS control circuit receives actuation control signals through at most 32 (or at most 16) signal conductors.

The CMOS control circuit may comprise a serial to parallel conversion circuit configured to convert a digital signal received in serial form through one or more signal conductors into a selection of piezoelectric actuators to be actuated to carry out a droplet ejection simultaneously (i.e. in parallel). The serial to parallel conversion circuit typically comprises one or more shift registers.

It may be that the droplet ejector assembly further comprises a fluid supply block in contact with one or more of the said layers and defining at least three separate fluid supply manifolds for supplying fluid of different colours or compositions of liquid to different said fluid chambers.

It may be that the fluid supply manifolds comprise a fluid conduit which is connected to each of a plurality of fluid chambers, to supply fluid of the same composition to each of the plurality of fluid chambers, wherein the piezoelectric actuator elements which define part of each of the plurality of fluid chambers are actuated by the CMOS control circuit, typically, responsive to actuation commands received through the same signal conductor.

The droplet ejector assembly is typically a drop-on-demand droplet ejector assembly, for example part of a drop-on-demand printhead.

The invention extends to a printhead (for example a pagewide printhead) comprising a plurality of droplet ejector assemblies driven from a common controller.

In a fourth aspect, the invention extends to a method of manufacturing a droplet ejector assembly for a printhead according to the first or second aspect of the invention, the method comprising: providing a substrate having a first surface, forming the CMOS control circuit on the first surface, forming the plurality of layers on the first surface, the plurality of layers comprising the piezoelectric actuator element comprising the first and second electrodes and the piezoelectric body.

The step of forming the piezoelectric actuator typically comprises: forming a first electrode; forming at least one layer of one or more piezoelectric materials on the first electrode at a temperature below 450° C.; and forming a second electrode on the at least one layer of one or more piezoelectric materials. The steps of forming the first electrode and forming the second electrode are also typically carried out at a temperature below 450° C. Typically, each of the one or more layers are formed at a temperature below 450° C. Forming the piezoelectric actuator (e.g. forming the first electrode, the one or more piezoelectric materials and the second electrode) at a temperature below 450° C. therefore permits integration of the piezoelectric actuator with the at least one electronic component (e.g. of the drive circuitry) without substantial damage to the said at least one electronic component.

It may be that the method comprises forming the piezoelectric actuator at a temperature below 300° C. The step of forming the piezoelectric actuator may comprise: forming a first electrode; forming at least one layer of one or more piezoelectric materials on the first electrode at a temperature below 300° C.; and forming a second electrode on the at least one layer of one or more piezoelectric materials. The steps of forming the first electrode and forming the second electrode may also be carried out at a temperature below 300° C.

Forming the piezoelectric actuator (e.g. forming the first electrode, the one or more piezoelectric materials and the second electrode) at a temperature below 300° C. permits integration of the piezoelectric actuator with the CMOS control circuit with even less damage to the CMOS control circuit.

The method typically comprises forming the piezoelectric actuator at a substrate temperature below 450° C. (or below 300° C.). In other words, the temperature of the substrate does not typically reach or exceed 450° C. (or below 300° C.) during forming the piezoelectric actuator. The step of forming the piezoelectric actuator therefore typically comprises: forming a first electrode; forming at least one layer of one or more piezoelectric materials on the first electrode at a substrate temperature below 450° C. (or below 300° C.); and forming a second electrode on the at least one layer of one or more piezoelectric materials. The steps of forming the first electrode and forming the second electrode are also typically carried out at a substrate temperature below 450° C. (or below 300° C.). It may be that the temperature of the substrate does not reach or exceed 450° C. (or 300° C.) during manufacture of the (e.g. entire) droplet ejector assembly.

It may be that the steps of forming all of the one or more layers are performed at a temperature less than 450° C. (or more typically below 300° C.).

It may be that the step of forming the piezoelectric actuator at a temperature below 450° C. (or more typically below 300° C.) comprises depositing the piezoelectric actuator at a temperature below 450° C. (or more typically below 300° C.). It may be that the step of forming the piezoelectric actuator at a temperature below 450° C. (or more typically below 300° C.) comprises depositing the piezoelectric actuator by one or more physical vapour deposition methods at a temperature below 450° C. (or more typically below 300° C.).

Physical vapour deposition methods (e.g. low-temperature physical vapour deposition methods) typically comprise one or more of the following deposition methods: cathodic arc deposition, electron beam physical vapour deposition, evaporative deposition, pulsed laser deposition, sputter deposition. Sputter deposition may comprise sputtering of material from single or multiple sputtering targets.

It may be that the step of forming the piezoelectric body comprises depositing at least one layer of one or more piezoelectric materials at a temperature below 450° C. (or more typically below 300° C.). It may be that the step of forming the piezoelectric body comprises depositing at least one layer of one or more piezoelectric materials by physical vapour deposition methods at a temperature below 450° C. (or more typically below 300° C.).

The method may comprise performing any post-deposition processing of the piezoelectric body at a temperature below 450° C. (or more typically below 300° C.). The method may comprise annealing the piezoelectric body at a temperature below 450° C. (or more typically below 300° C.). However, more typically, the method does not comprise a post-deposition processing (e.g. annealing) step.

The step of forming the piezoelectric actuator may comprise forming the piezoelectric body from a ceramic material comprising aluminium and nitrogen and optionally one or more elements selected from: scandium, yttrium, titanium, magnesium, hafnium, zirconium, tin, chromium, boron.

The step of forming the piezoelectric body may comprise forming at least one layer of one piezoelectric material, or layers of more than one piezoelectric material.

The step of forming the at least one layer of one or more piezoelectric materials may consist of forming one layer of said one or more piezoelectric materials. Alternatively, the step of forming the at least one layer of one or more piezoelectric materials May consist of forming more than one layer of said one or more piezoelectric materials.

The one or more piezoelectric materials may comprise aluminium nitride. Additionally or alternatively, the one or more piezoelectric materials may comprise zinc oxide. It may be that the step of forming the piezoelectric actuator at a temperature below 450° C. (or more typically below 300° C.) (e.g. the step of forming the at least one layer of one or more piezoelectric materials at a temperature below 450° C. (or more typically below 300° C.)) comprises depositing aluminium nitride (AlN) and/or zinc oxide (ZnO) at a temperature below 450° C. (or more typically below 300° C.).

Aluminium nitride may consist of pure aluminium nitride. Alternatively, aluminium nitride may comprise one or more elements (i.e. aluminium nitride may comprise aluminium nitride compounds). Aluminium nitride may comprise one or more of the following elements: scandium, yttrium, titanium, magnesium, hafnium, zirconium, tin, chromium, boron.

It may be that the step of forming the piezoelectric actuator at a temperature below 450° C. (or more typically below 300° C.) (e.g. the step of forming the at least one layer of one or more piezoelectric materials at a temperature below 450° C. (or more typically below 300° C.)) comprises depositing scandium aluminium nitride (ScAlN) at a temperature below 450° C. (or more typically below 300° C.).

The percentage of scandium in scandium aluminium nitride is typically chosen to optimize the $d_{31}$ piezoelectric constant within the limits of manufacturability. For example, the value of x in $Sc_xAl_{1-x}N$ is typically chosen from the range $0<x\leq 0.5$. Greater fractions of scandium typically result in larger values of $d_{31}$ (i.e. stronger piezoelectric effects). The mass percentage (i.e. the weight percentage) of scandium in scandium aluminium nitride is typically greater than 5%. The mass percentage (i.e. the weight percentage) of scandium in scandium aluminium nitride is typically greater than 10%. The mass percentage (i.e. the weight percentage) of scandium in scandium aluminium nitride is typically greater than 20%. The mass percentage (i.e. the weight percentage) of scandium in scandium aluminium nitride is typically greater than 30%. The mass percentage (i.e. the weight percentage) of scandium in scandium aluminium nitride is typically greater than 40%. The mass percentage (i.e. the weight percentage) of scandium in scandium aluminium nitride may be less than or equal to 50%.

It may be that the one or more piezoelectric materials comprise one or more III-V and/or II-VI semiconductors (i.e. compound semiconductors comprising elements from Groups III and V and/or Groups II and VI of the Periodic Table). Such III-V and II-VI semiconductors typically crystallise in the hexagonal wurtzite crystal structure. III-V and II-VI semiconductors crystallising in the hexagonal wurtzite crystal structure are typically piezoelectric due to their non-centrosymmetric crystal structure. Accordingly, it may be that the step of forming the piezoelectric actuator at a temperature below 450° C. (or more typically below 300° C.) (e.g. the step of forming the piezoelectric body at a temperature below 450° C. (or more typically below 300° C.)) comprises depositing one or more III-V and/or II-VI semiconductors at a temperature below 450° C. (or more typically below 300° C.).

It may be that the one or more piezoelectric materials comprise non-ferroelectric piezoelectric materials. Ferroelectric materials typically require (i.e. post-deposition) poling under strong applied electric fields. Non-ferroelectric piezoelectric materials typically do not require poling.

The piezoelectric body of the piezoelectric actuator typically has a piezoelectric constant $d_{31}$ having a magnitude less than 30 pC/N, or more typically less than 20 pC/N, or even more typically less than 10 pC/N. The one or more piezoelectric materials typically have piezoelectric constants $d_{31}$ having magnitudes less than 30 pC/N, or more typically less than 20 pC/N, or even more typically less than 10 pC/N.

Forming the first electrode typically comprises depositing one or more layers of metal (such as titanium, platinum, aluminium, tungsten or alloys thereof) onto the nozzle forming layer. The metal may be deposited by (e.g. low-temperature) PVD. The metal is typically deposited at a temperature below 450° C. (or more typically below 300° C.).

Forming the second electrode on the piezoelectric body typically comprises depositing one or more layers of metal (such as titanium, platinum, aluminium, tungsten or alloys thereof) onto the piezoelectric body. The metal may be deposited by (e.g. low-temperature) PVD. The metal is typically deposited at a temperature below 450° C. (or more typically below 300° C.).

The method may comprise integrally forming (e.g. integrating) the substrate, the CMOS control circuit, the piezoelectric actuator (e.g. comprising the first electrode, the piezoelectric body, and the second electrode) the fluid chamber and the droplet ejection output thereby forming a monolithic droplet ejector assembly. The droplet ejector assembly may be a droplet ejector chip.

Optional features disclosed in respect of any aspect of the invention are optional features of each aspect of the invention.

BRIEF DESCRIPTION OF THE FIGURES

The invention will now be described with reference to the following Figures.

DETAILED DESCRIPTION

Figure 1:
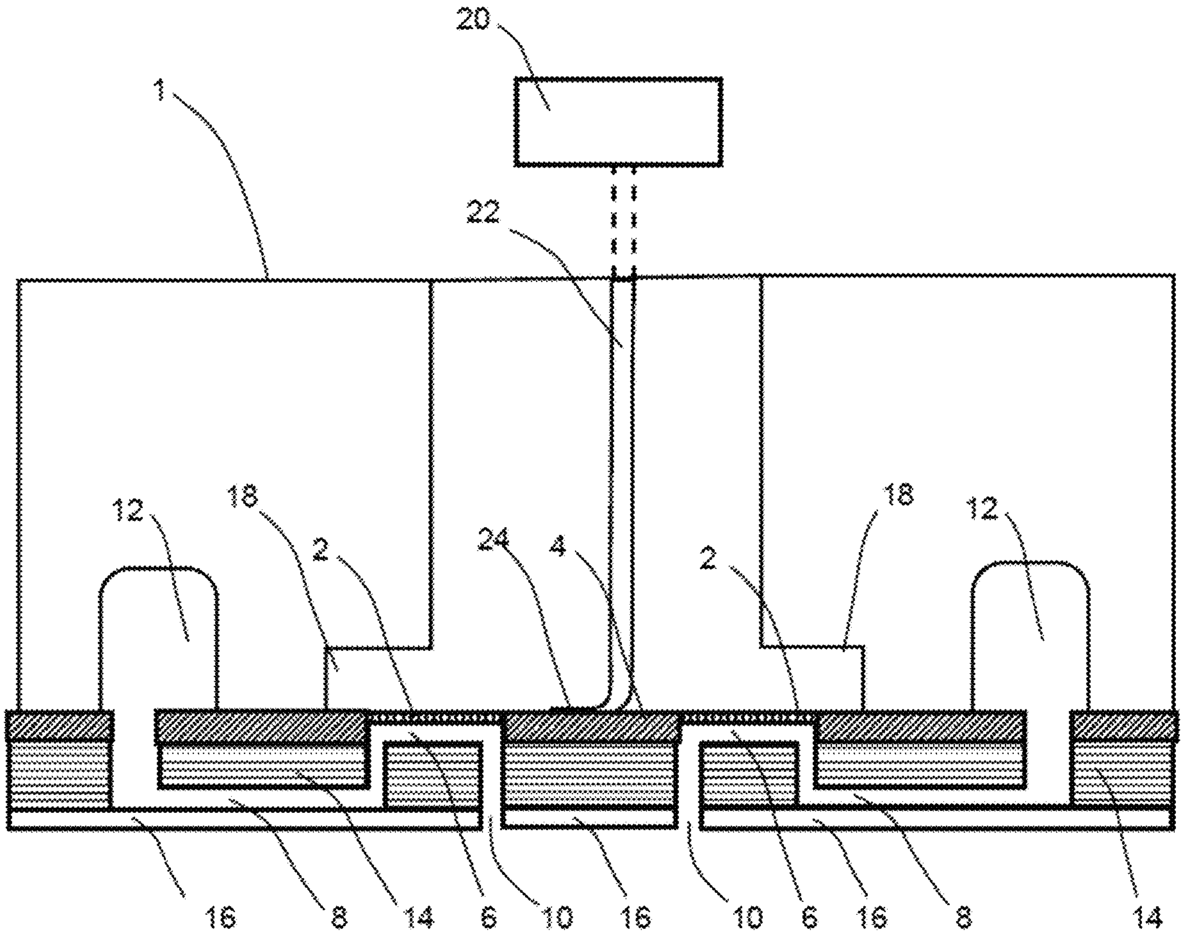
Fig. 1 (PRIOR ART)
FIG. 1 is a schematic cross section of a prior art droplet ejector chip.

With reference to FIG. 1, a known class of inkjet printheads 1 comprises piezoelectric actuator elements 2 formed as layers on a silicon printhead substrate 4. The actuator elements each form a wall of a fluid chamber 6 which is in fluid communication with an ink reservoir 12 through a conduit 8 and with a nozzle 10 having a radius in the range 6 to 25 μm. The ink fluid chamber and conduit are formed in a fluid manifold layer 14 covered with a nozzle defining layer 16 having the nozzles therein. Chambers 18 behind each actuator provide space for the actuator to flex to pull ink into the respective fluid chamber and eject it from the respective nozzle. In some embodiment chambers may be vented directly into the flex cavity as shown. An external controller 20 drives the actuators via a flexible interconnect 22 which contains a chip on film (COF) having latches and/or nozzle trim data which switch individual piezoelectric actuators on. The flexible interconnect connects to the silicon through a parallel connection 24 which contains individual signal conductors for each piezoelectric actuator. Accordingly, for printheads with many actuators, the flexible interconnect has many individual signal conductors. If there are 600 nozzles per inch, for example, there are at least 600 individual connections per inch. Conductive line attachments at greater than 600 per inch are very difficult to achieve reliably. The target for a high resolution printer needs to be greater than 1000 per inch. This is very important to achieve for a stationary pagewide printhead that cannot scan in order to achieve high target resolutions. Thus, a four colour printhead at 1200 dots per inch requires 4800 connections per inch.

Figure 2:
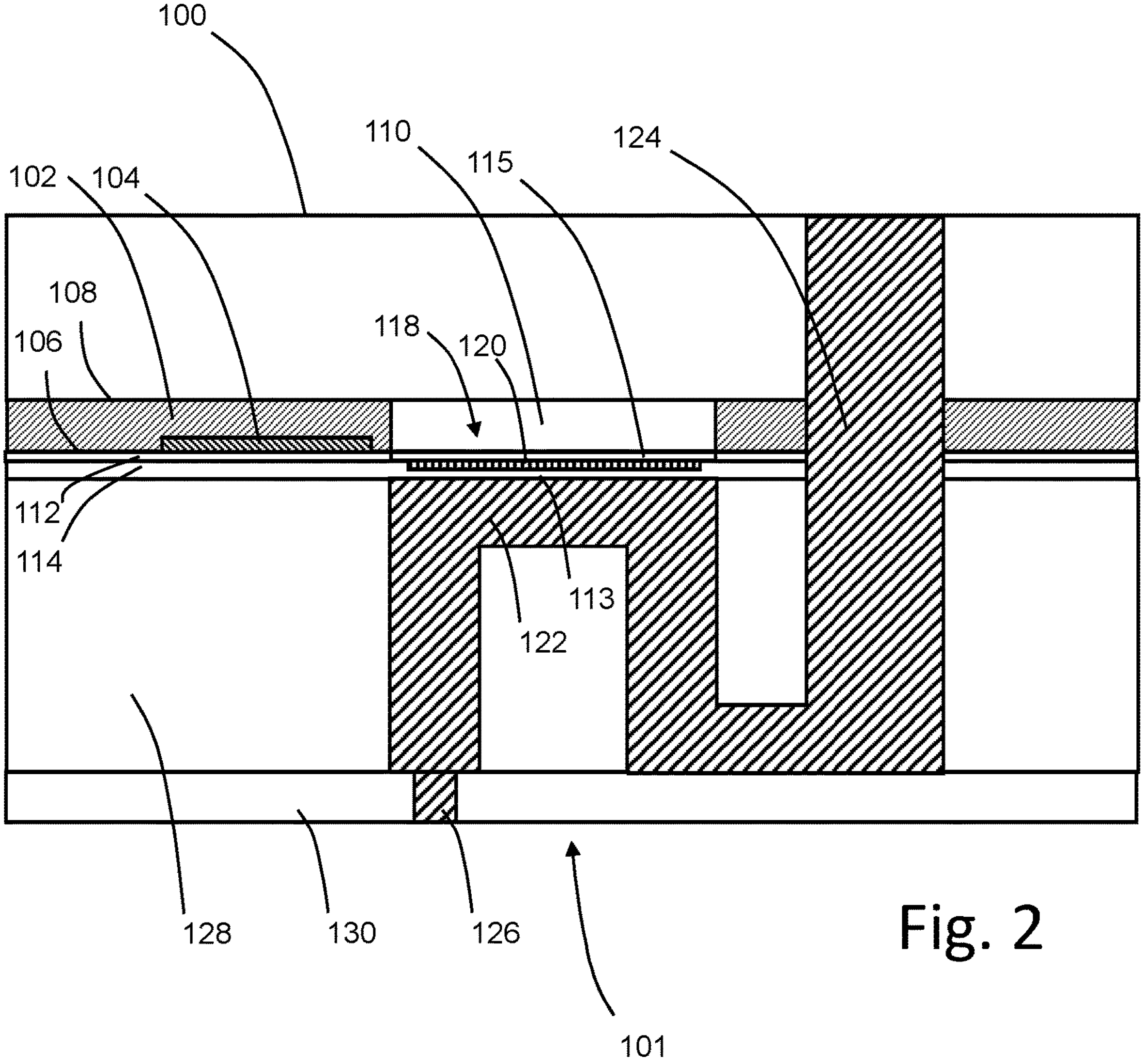
FIG. 2 is a cross section of a droplet ejector chip showing a single actuator according to the invention.

With reference to FIG. 2, a droplet ejector chip 100 (functioning as the droplet ejector assembly) according to the invention comprises a silicon substrate 102 comprising CMOS control circuit 104 on the first surface 106 of the substrate. There may, in addition, be circuit components on the opposite second surface 108. The person skilled in the art will appreciate that a CMOS circuit comprises both doped regions of the substrate and metallisation layers and interconnections formed on the first surface of the substrate. The substrate has a DRIE etched aperture 110. This aperture May also be formed using an anisotropic etch with slanted side walls. A plurality of layers shown generally as 112, 114 are formed on the first surface of the substrate. Layer 112 is the CMOS metallization layer and comprises metal conductive traces and a passivation insulator such as $SiO_2$, SiN, SiON. All or some of these layers may (or may not) extend across the aperture 110 to form a piezoelectric actuator element 118 comprising a piezoelectric body 120 which in this examples is formed of AlN or ScAlN but may be formed of another suitable piezoelectric material which is processable at a temperature of below 450° C. The piezoelectric actuator element forms a diaphragm with layers 115 of materials such as silicon, silicon oxide, silicon nitride or derivatives thereof and has a passivation layer 113 which prevents applied electrical potentials from contacting fluid.

At least one metallisation layer 112 includes interconnects, conducting signals from the external controller 20 to the control circuit and from the control circuit to the piezoelectric actuator element, in particular to first and second electrodes (not shown in FIG. 2) arranged to apply an electrical potential difference across and thereby actuate the piezoelectric body.

The piezoelectric actuator element 118 defines a wall of a fluid chamber 122 which receives ink (in the case of an inkjet printer) or another printable fluid (for example in the case of an additive manufacturing printer) through a conduit 124 and which is in communication with a nozzle 126 for ejecting liquid. The conduit is defined by a channel defining layer 128 mounted to the layers on the surface of the substrate, which may for example be defined by DRIE etching of silicon substrates and or wafer bonding, and a nozzle defining layer 130 provides the external surface of the printhead and has apertures which define the nozzles 126. The piezoelectric actuator element 118, chamber 122 and nozzle 126 together form a droplet ejector shown generally as 101.

Figure 3:
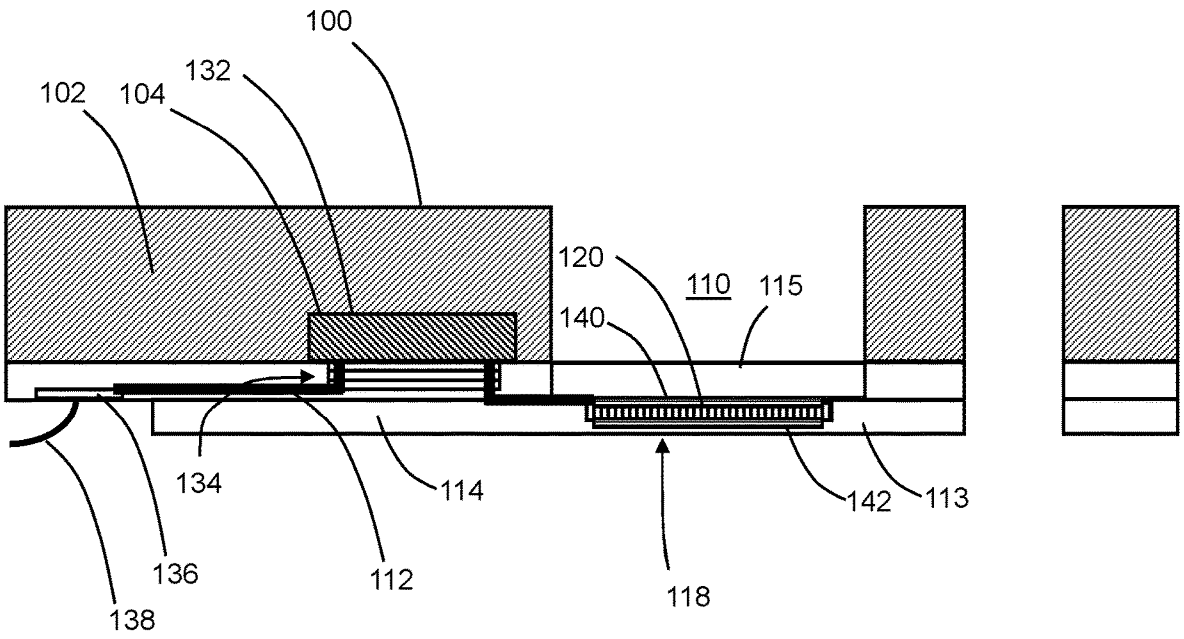
FIG. 3 is a further schematic cross section of the monolithic droplet ejector chip substrate with CMOS and actuators of FIG. 2.

FIG. 3 shows more details of the CMOS/actuator substrate and electrical connections of the droplet ejector chip 100 of FIG. 2. The CMOS control circuit comprises patterned regions of doped silicon 132 and metallisation layers 134. The number of metallisation layers depends on the complexity of the CMOS control circuit but three layers should suffice for many applications. Metallization layer 112 extends from contact pads 136 where a cable 138 connects to the CMOS control circuit which are subsequently connected to first and second electrodes 140, 142 located on and in contact with opposite sides of the piezoelectric body 140. Although two electrodes are shown here, there may be two or more electrodes on either side of, or different regions of, the piezoelectric body.

Figure 4:
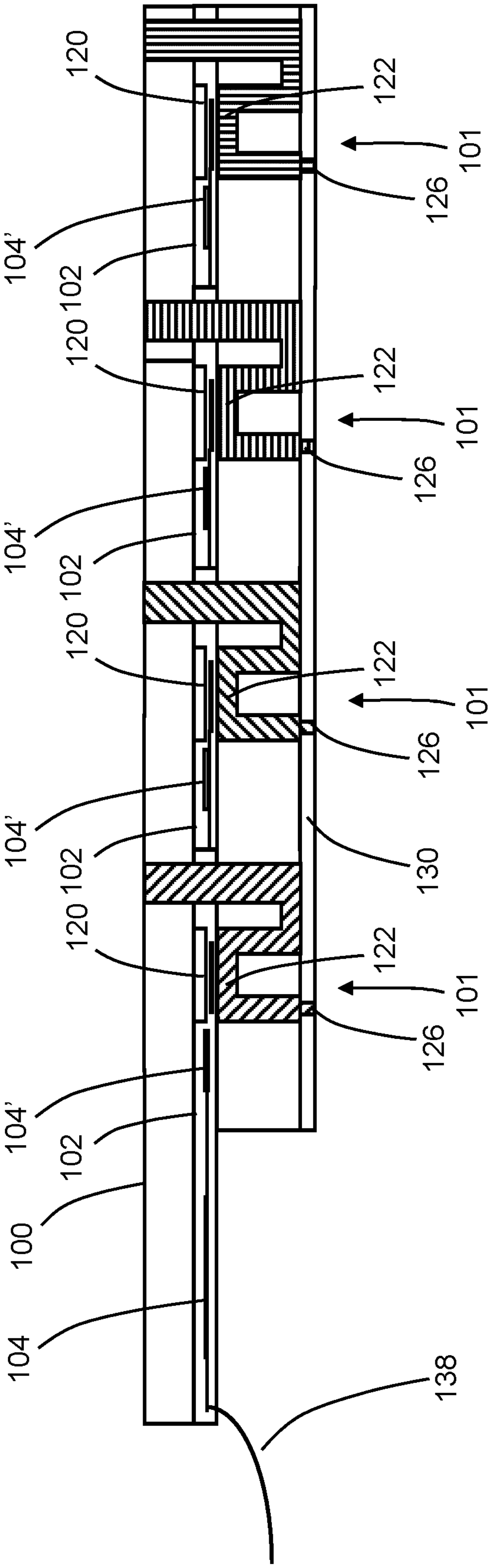
FIGS. 4 and 5 show possible droplet ejector chip configurations according to the invention.
Figure 5:
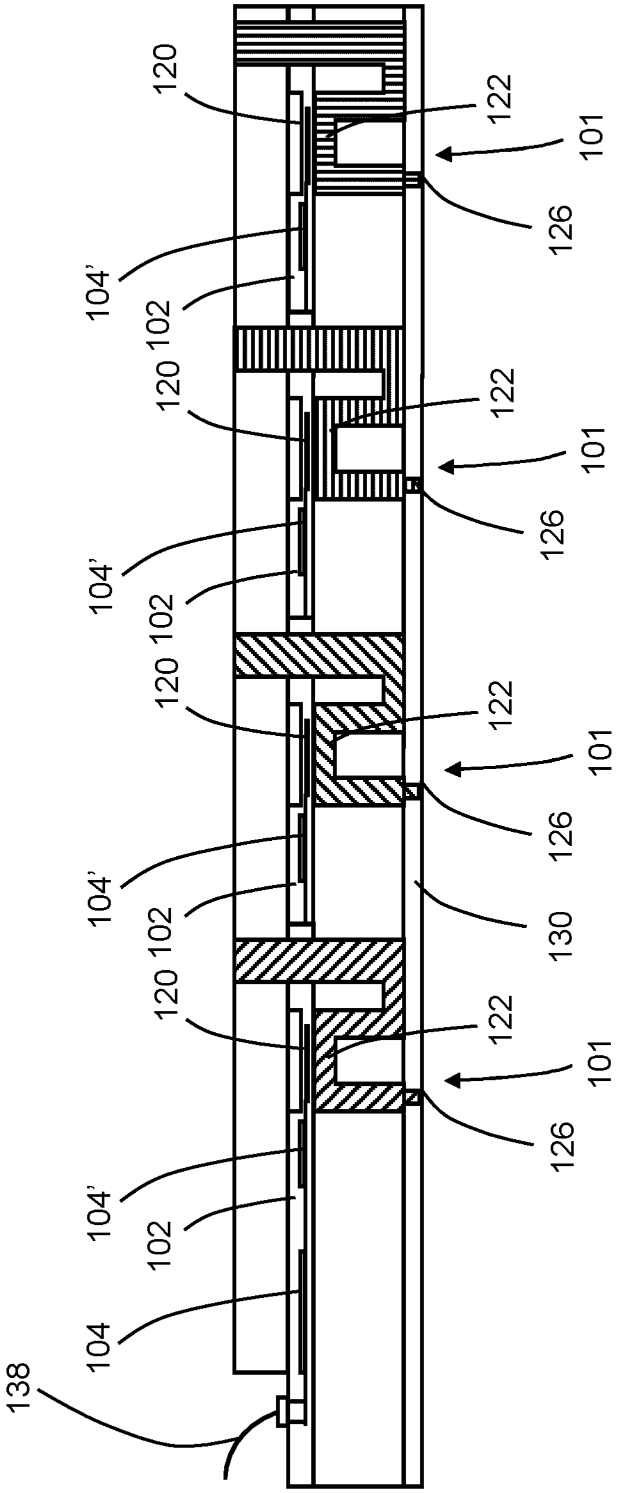

With reference to FIGS. 4 and 5 which shows a printhead formed of a single droplet ejector chip 100 (functioning as the droplet ejector assembly) having multiple droplet ejectors (individual piezoelectric actuators, fluid chambers and droplet ejection outlets), flexible cable interconnect 138 with a limited number of signal conductors connects an external controller through wires 144 to a printhead assembly that comprises multiple droplet ejectors shown as 101, for ejecting inks of different colours. The droplet ejector chip with multiple droplet ejectors is typically formed from a single CMOS/actuator substrate. In these examples, as well as the main portion of CMOS control circuit 104, the CMOS control circuit includes separate circuit elements 104' associated with each droplet ejector, which may for example comprise a latch and an ejector transistor for each piezoelectric actuator.

Figure 6:
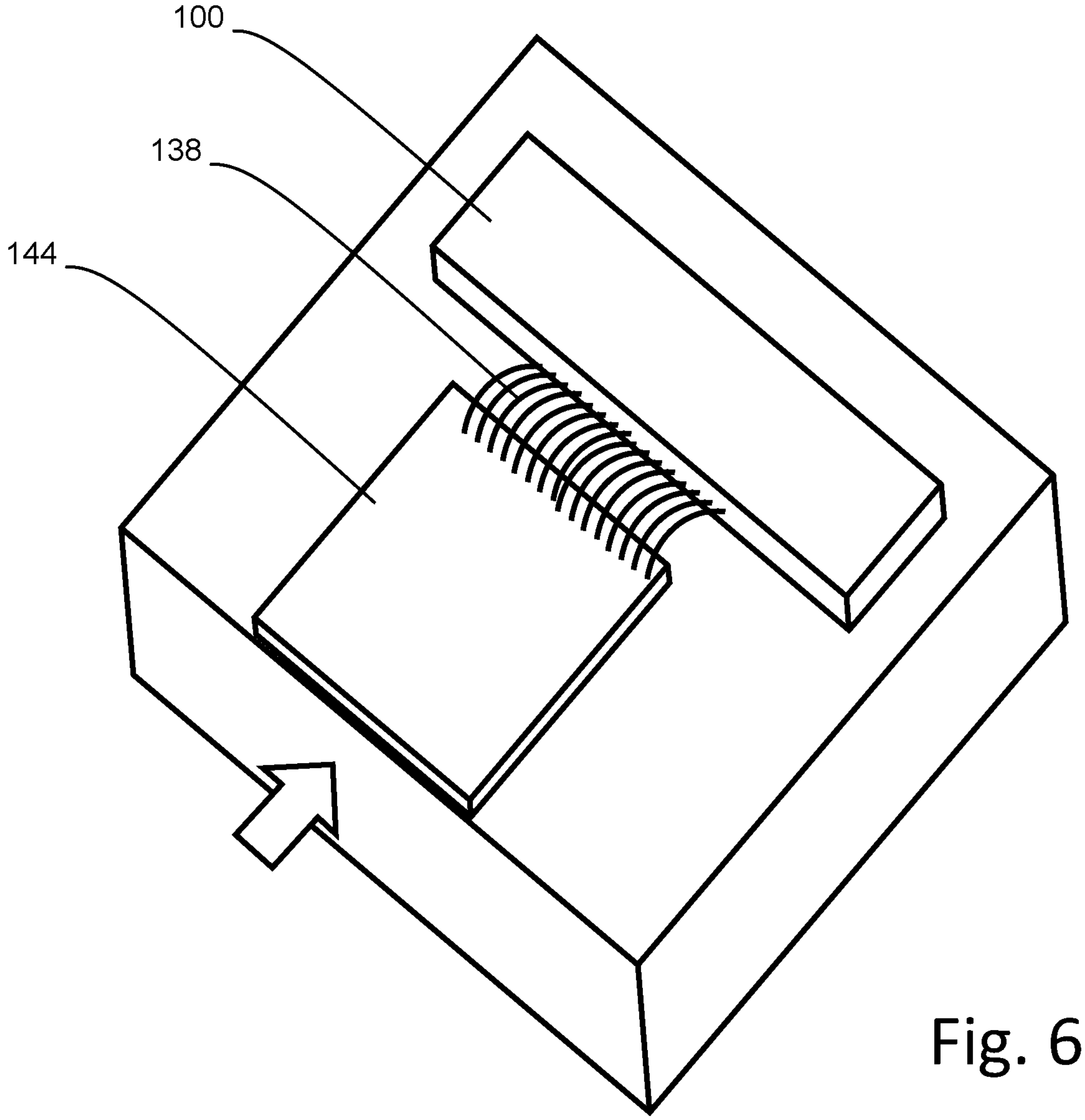
FIGS. 6 and 7 show control printhead configurations.
Figure 7:
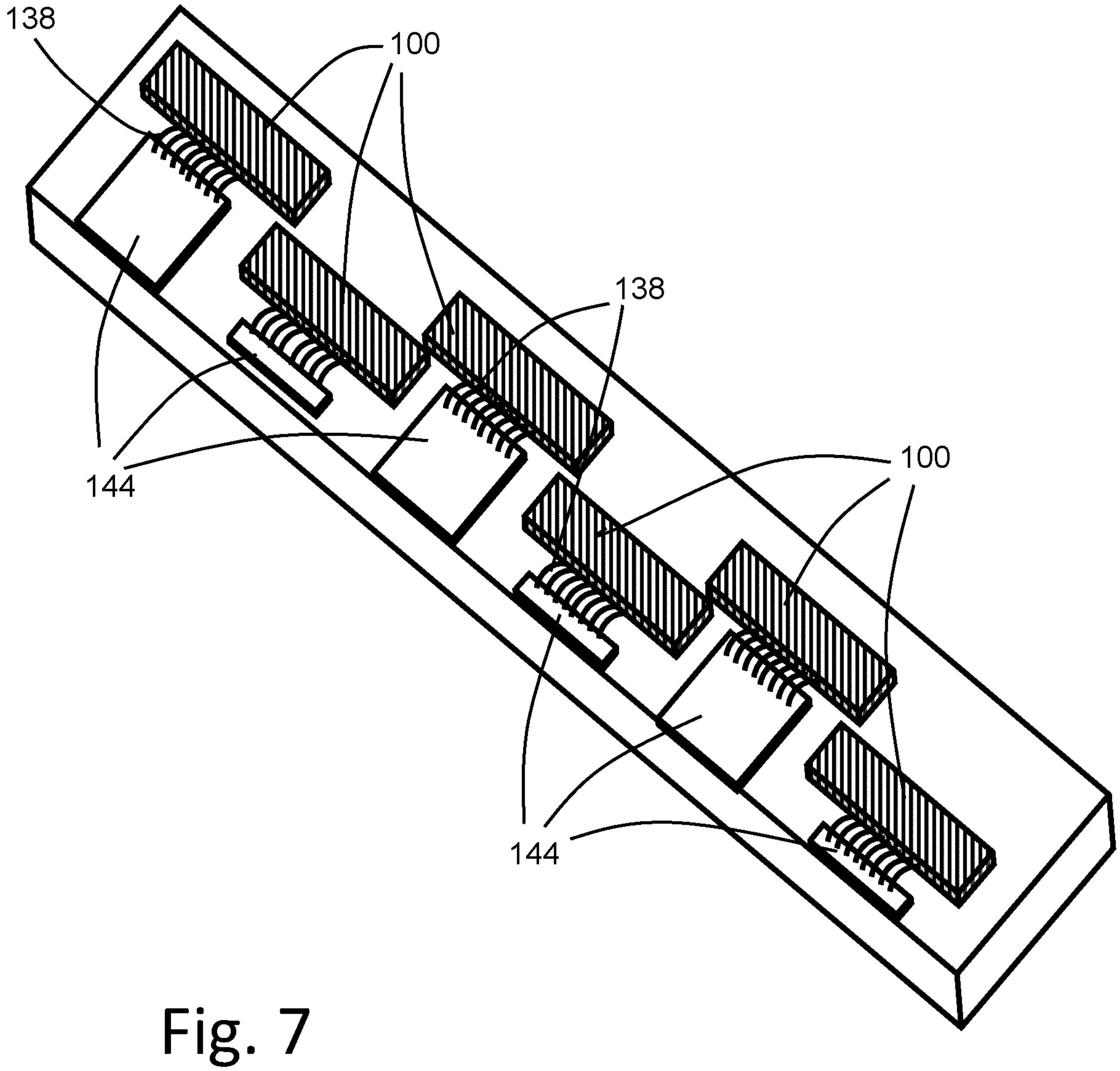

FIGS. 6 and 7 show the arrangement of flexible cable 144 and flexible cable interconnect 138 and droplet ejector chips 100 for a printhead having a single droplet ejector chip/substrate (FIG. 6) and for a printhead having a plurality of different droplet ejector chips having individual substrates (FIG. 7). Due to the integration of the control circuit in the substrate, the number of signal conductor may be less, and potentially much less, than the number of discrete actuators.

Figure 8:
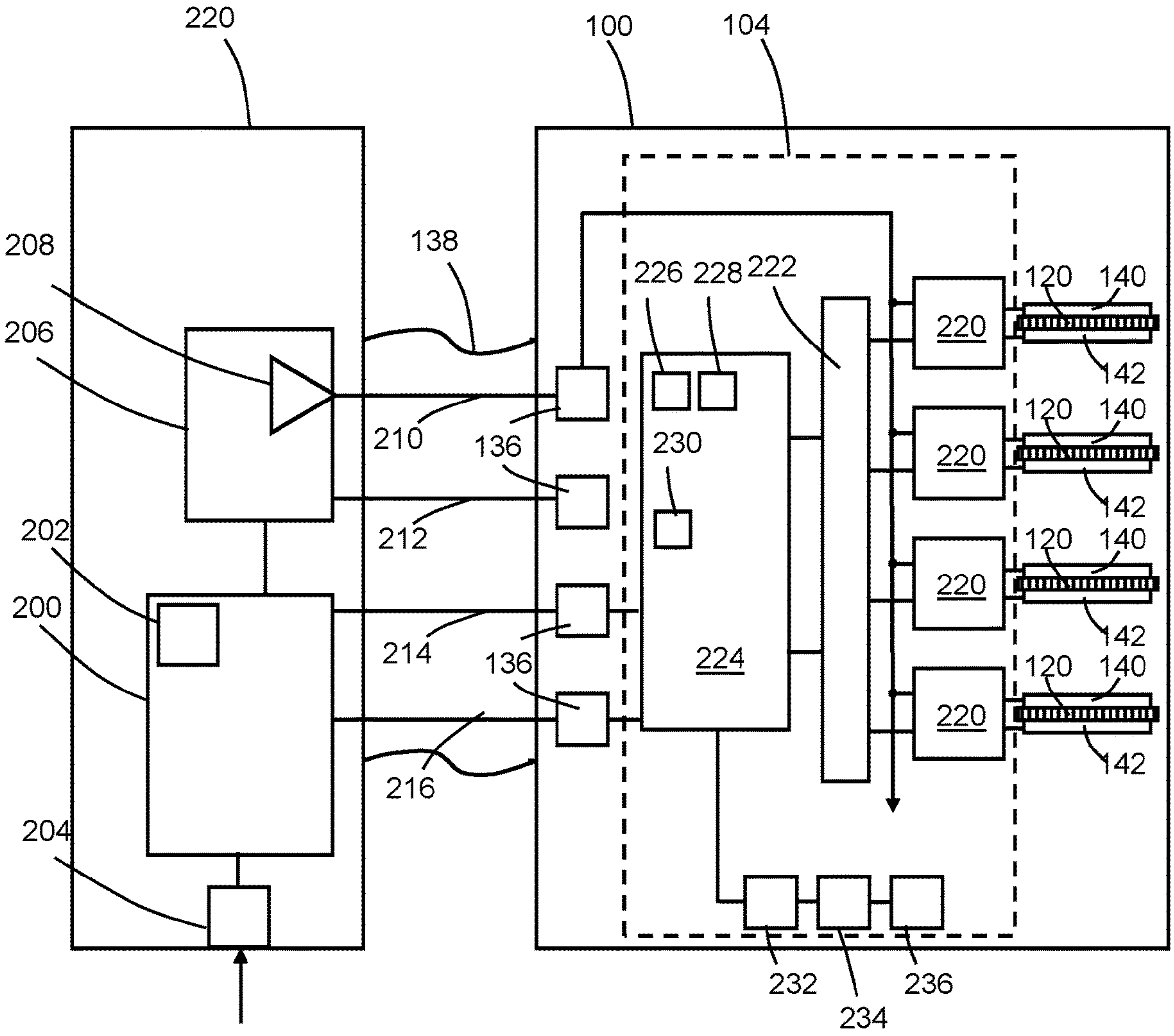
FIG. 8 is a schematic diagram of print control circuitry.

FIG. 8 is a block diagram of the control circuitry for a printhead according to the invention. Actuator control is distributed between a machine controller 220 and the CMOS circuit 104 within the droplet ejector chip 100. They are connected in part by conductors extending through a single or multiple flexible cable interconnects 138. Multiple actuators 120 are controlled by the application of potentials to their electrodes 140, 142. The machine controller comprises at least a processor 200, such as a microprocessor or microcontroller which has memory 202 storing relevant data and program code. A wired or wireless electronic interface 204 receives input data from an external device driver. One skilled in the art will appreciate that the machine controller may be distributed between a number of separate components or functional modules, such as one component which converts an image into a pixelated pattern for printing using a dither matrix, for example, and a separate component which converts the pixelated pattern into a print pattern for the different nozzles.

The machine controller may comprise at least one waveform generator and a voltage amplifier 208 which provides a continuous pattern of actuator control pulses (shown in FIG. 9) to the printhead through one or more drive signal conductors 210. A ground conductor 212 also extends from the machine controller to the droplet ejector chip 100. (Ground connections within printhead not shown for clarity). The processor 200 generates digital control signals 214 typically as a serial bus, and also transmit clock signals 216 to the printhead which serve to synchronise printing with movements of the printhead. The connector also provides voltage levels associated with the operational voltage of CMOS control electronics.

Within the printhead, contact pads 136 are connected to the conductors of the flexible connector and signals are routed through patterned metallised layer 112 to the CMOS control circuit 104 and from the CMOS control circuit to the electrodes 140, 142 which actuate individual piezoelectric bodies 120 within respective piezoelectric actuators. The control circuit 104 on substrate 102 comprises ejection switch circuit 220, including ejection transistors having outputs which are in direct electrical connection with the electrodes 140, 142 (i.e. without a further intervening switching semiconductor junction). The ejection switch circuit switches the actuator control pulse signals and if one of the electrodes remains connected to ground, the ejection switch circuit may be as simple as single transistor per actuator, or a single transistor per electrode to switch the signal applied to that electrode. The ejection switch circuit may be distributed around the substrate with a portion (e.g. a transistor or transistor and latch) proximate each droplet ejector, corresponding to feature 104' of FIGS. 4 and 5.

The ejection switch circuit does not carry out power amplification. Instead it switches the actuator control pulses, determining whether each pulse is relayed to the respective actuator or not, for each pulse. Voltage amplification is carried out in the machine controller by amplifier 208.

The ejection switch circuit is controlled by latch and shift transistors 222, which receive and store digital data from a control circuit 224 which processes received data, for example converting received serial data, storing these in registers 226 and using the received data to determine which actuators are to actuate during each successive actuator firing events. The control circuit 228 also stores trim data used to customise the precise timing of voltage switching for each actuator, which is typically determined during a calibration step on set-up, and may store configuration data 230 which indicates the physical layout of nozzles, security information and or nozzle actuation count history information. The control circuit 224 also receives data from sensors 232, 234, 236, some of which are associated with individual actuators, for example nozzle fill levels sensors, and some of which sense parameters relevant to the function of the printhead as a whole, for example temperature sensors.

Figure 9:
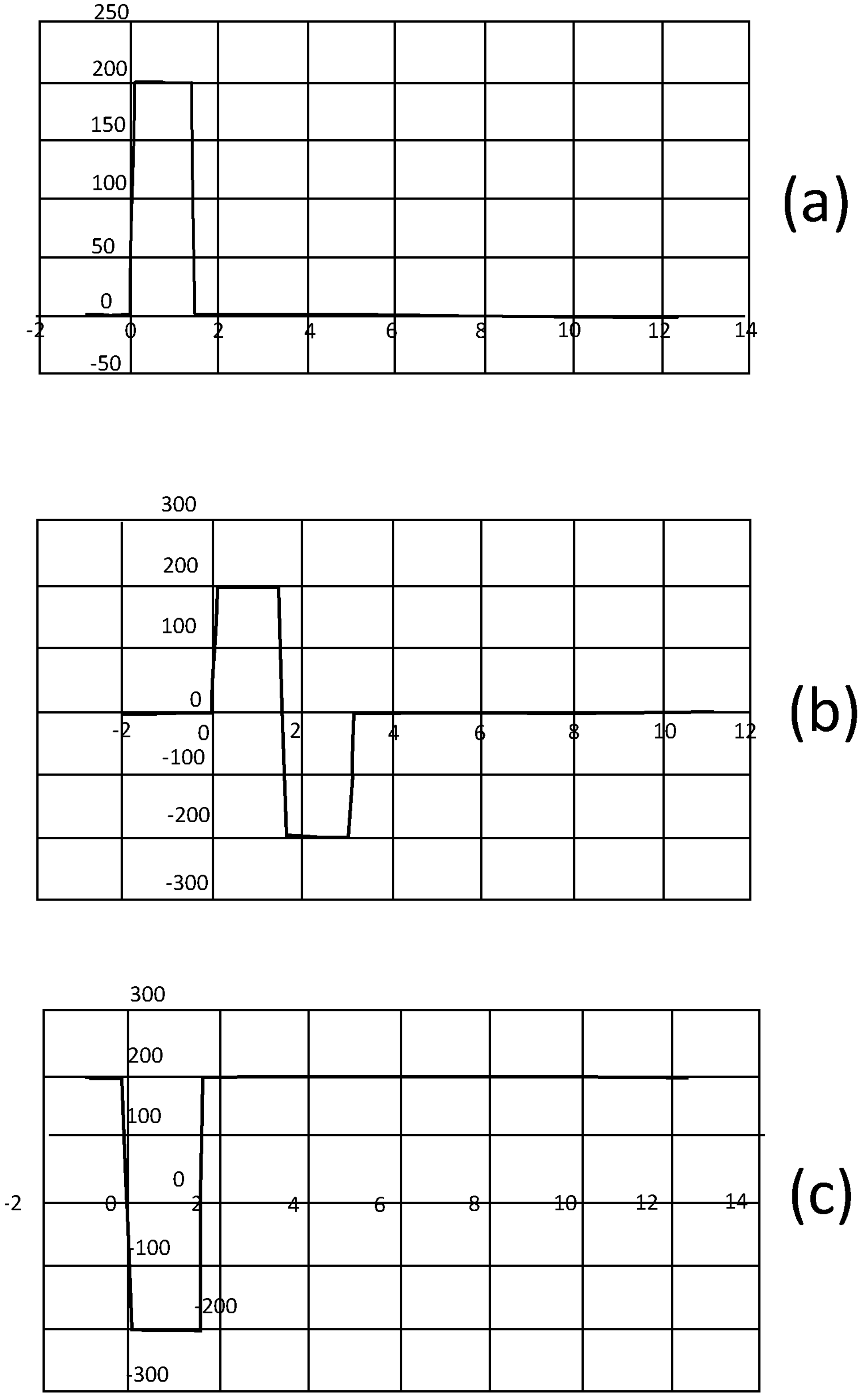
FIGS. 9(*a*) through 9(*c*) show actuator control pulses; the x-axis is time and y-axis is voltage per μm thickness of the piezoelectric body.

FIG. 9 shows three possible drive waveforms generated by waveform generator or voltage amplification 206 in alternative embodiments. The x axis is time (in milliseconds) and the y axis is potential per μm thickness of actuator. As the piezoelectric bodies are made of a non-ferroeletric material in this example the pulses may be applied in either direction. In FIG. 9(*a*) the signals have a default voltage of 0 and in each pulse are switch to a positive potential and back to zero after a predetermined period of time. In FIG. 9(*b*) the signals have a default voltage of 0 and are switched first to a positive potential (to cause the piezoelectric actuator to deform in one direction) and then to a negative potential (to cause the piezoelectric actuator to deform in the opposite direction) before returning to zero. In FIG. 9(*c*) the signals have a default voltage of 200V and are switched to a voltage of −200V (causing the electric fields in the piezoelectric body to reverse in direction) before returning to 200V.

During operation, the processor 200 receives printing data, such as bitmaps, in digital form through interface 204 and processes this data by known means to send a sequence of printing instructions through serial connection 216 to each droplet ejector chip. These printing instructions may be as detailed as instructions for each droplet ejector chip as to whether and when to eject a droplet during printing cycles. In one embodiment, the waveform generator generates repeating voltage pulses suitable for application to the electrodes of individual piezoelectric actuators. These are periodic with a time spacing which determines the time between droplet ejection events on the printhead. Alternatively, the voltage amplification, 208, may provide and maintain a single voltage level of multiple voltage levels to the printhead assembly. The ejection transistors within the droplet ejector chip will switch these voltages according to the CMOS control circuit.

As the waveform generator or generators are not located on the printhead and is used to drive numerous piezoelectric actuators, it or they can generate a significant amount of heat without causing problems. There are not substantial substrate space limitations so it or they may be relatively complex circuits adapted to carefully control the shape of the waveform, with selected, and optionally variable, slew rates, and the power amplifier may be selected to produce the desired voltage up to the maximum possible current requirement in the event that all actuators which may be actuated simultaneously be actuated together.

The control circuit 224 on an individual printhead substrate receives the printing instructions through serial connection 216 and processes these (for example converting from serial to parallel instructions). With reference to the clock signals 214, it is determined whether each individual piezoelectric actuator should be actuated to eject a droplet during each printing cycle and this data is loaded into latches 222. At an appropriate time during each printing cycle, the latched data is passed to the ejection switch circuit which thereby either switch the received printing waveform to the electrodes of the respective actuator element, causing it to carry out a droplet ejection cycle, or to not do so in which case both electrodes of the respective actuator element remain connected to ground and the droplet ejector does not carry out a droplet ejection cycle.

Sensors 232, 234, 236 are monitored during printing. The precise timing of switching the received printing waveform to the electrodes of the respective actuator element can be varied responsive to a measure of temperature using a temperature sensitive CMOS element.

Each nozzle may have slightly different ejection characteristic behaviour (drop volume, velocity) based on variance in wafer manufacturing (on a single wafer—or between wafer lots), due to printhead assembly, due to actuation lifetime. This data can be used to alter the drive waveform for specific nozzles by the CMOS control circuit—for example—changing the actuation pulse duration or switching to a different level—or to switch certain nozzles to different drive waveforms.

The viscosity and surface tension of some inks is highly sensitive to temperature—this ultimately changes the droplet ejection characteristics. Certain print patterns will result in certain nozzles firing continuously whereas others fire sporadically. This will result in a variable heat pattern. The monitored temperature can be used by the control circuit to modify waveforms and/or feedback control information to the controller for appropriate action such as reducing print speed etc.

The shift registers move the droplet fire pattern information through to the latch registers. Thus, the shift registers interface with the serial connection, and move all print data to the latch registers in a given print cycle. The latch registers interface with the ejection registers to initiate a print command.

The droplet ejector chips are made by first forming the CMOS control circuit 104, 134 and the metal interconnect layer 112 on the substrate 102. The CMOS circuit is formed by standard CMOS processing methodologies including ion implantation on a p-type or n-type substrate and the interconnect later is also formed by standard processes such as ion implantation, chemical vapour deposition, physical vapour deposition, etching, chemical-mechanical planarization and/or electroplating.

Additional layers of material are formed on the substrate, including the electrodes 140 and 142, with an intervening piezoelectric body using successive thin film deposition techniques. Each step must avoid damage to the CMOS control circuit. The piezoelectric body is formed of a material such as AlN or ScAlN which may be deposited at a temperature below 450° C. by PVD (including low-temperature sputtering). Electrodes are formed of, for example titanium, platinum, aluminium, tungsten or alloys thereof. Fluid channels and apertures through the substrate may be formed using etching procedures such as DRIE. Channel defining layer 128 may be formed using DRIE etch and wafer bonding of silicon MEMS substrates. The nozzle defining layer can be formed of metal, silicon MEMS wafer or a plastics material by deposition on or adhesion to the channel defining later. Each droplet ejector chip is connected to the machine controller via a flexible interconnect. In contrast to prior art devices according to FIG. 1, the number of discrete conductors in the flexible interconnect is limited, for example 4 to 16 conductors.

The material from the which the piezoelectric body is formed cannot be and is not PZT due to the requirement to avoid damaging the CMOS control circuit upon which the piezoelectric actuator, including the piezoelectric body is formed. Accordingly, the piezoelectric actuator has a piezoelectric constant $d_{31}$ which is much lower, usually at least one and potentially two orders of magnitude, less than PZT depending on its precise composition. On the face of it, this would make it impossible for the printhead ejector to operate properly. However, we have found that it is nevertheless possible for the printhead ejector to operate because:

piezoelectric materials such as AlN, ScAlN and ZnO can have a higher breakdown voltage than PZT, and so may be operated with a higher potential gradient, allowing a corresponding force to be applied to the actuator;

piezoelectric materials such as AlN, ScAlN and ZnO can have a higher Young's modulus than PZT, increasing the force which they can exert;

in some embodiments, the actuator control pulses may be generated off chip and switched by transistors with the control circuit on the substrate supporting the 34 piezoelectric actuator, enabling relatively high voltages to be applied when required to the piezoelectric bodies;

some piezoelectric materials other than PZT are non-ferroelectric and so are actuated in different directions by electric fields in opposite directions, enabling a greater change in electric field (from a negative field strength to a positive field strength or vice versa), which increases the variation in the forces applied to the actuator during a printing cycle.

Figure 10:
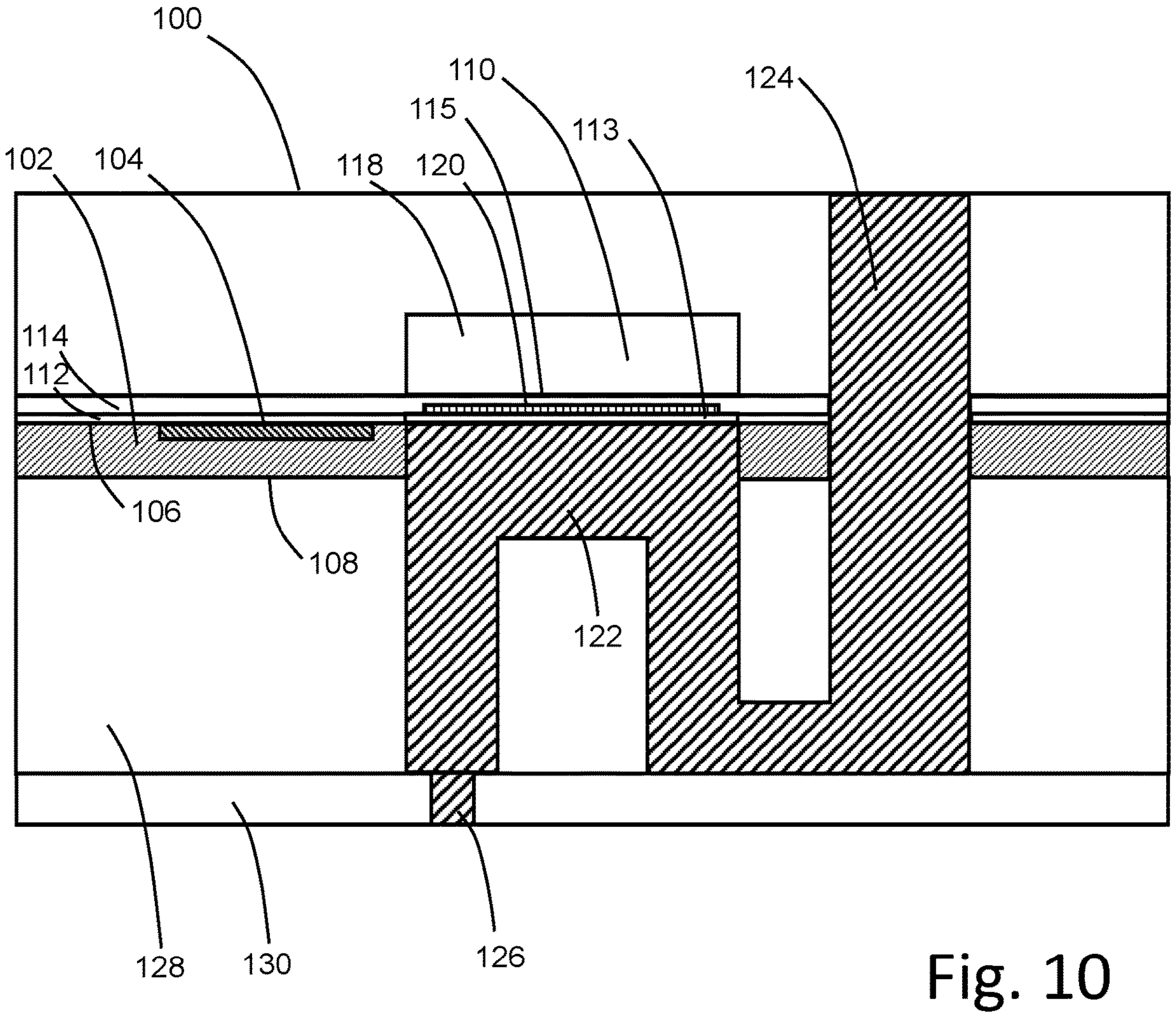
FIGS. 10 through 12 show three alternative droplet ejector chips showing single actuator configurations.
Figure 11:
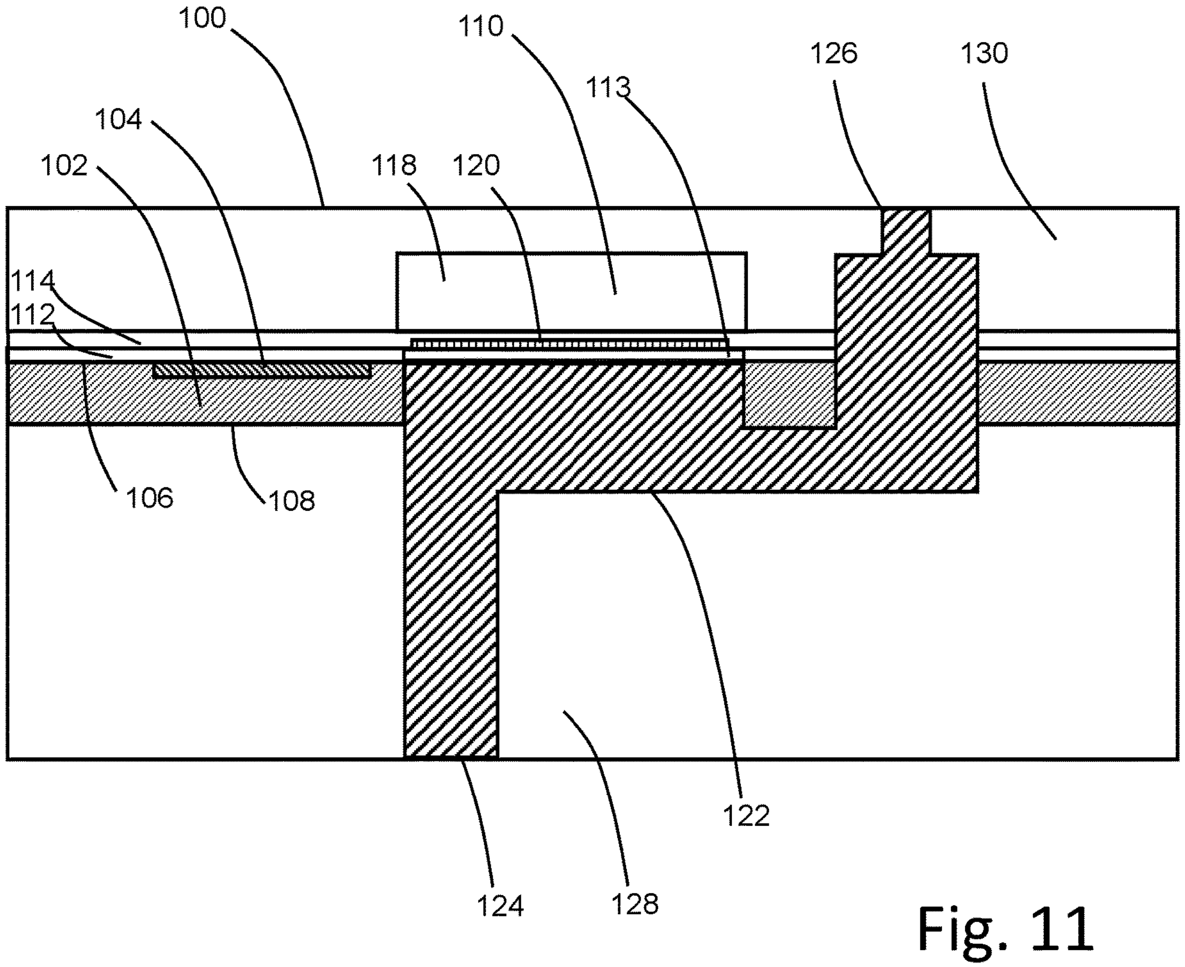
Figure 12:
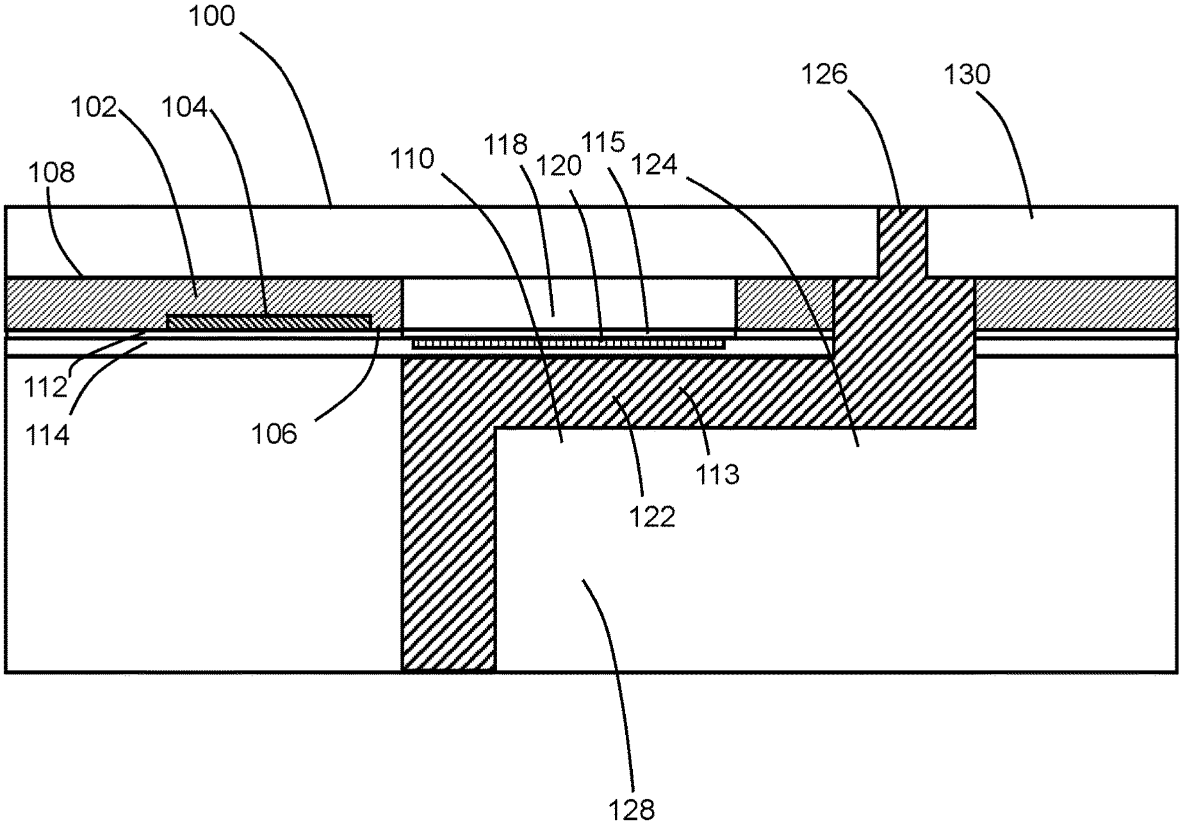

The droplet ejector chips may have alternative configurations and several are shown in FIGS. 10 through 12, where features corresponding to those which have already been described are labelled with corresponding numbers. In the embodiments of FIGS. 10 and 11, there is a through silicon hole, formed through the silicon substrate 102 for example using a DRIE etch or anisotropic etch procedure. The fluid chamber 122 extends into the substrate and the head volume 110 provides a vent for air flow during actuation.

Referring back to FIGS. 4 and 5, the flexible interconnect may be mounted to an edge of a printhead and used to drive several or many individual droplet ejector chips, for example droplet ejector chips for different colours of ink (or other materials in the case of an additive printer) or droplet ejectors for different colours of ink (or other materials) may all be formed in a single continuous substrate in an individual droplet ejector chip.

In an alternative embodiment, instead of the machine controller including a waveform generator and the waveform being conducted to the droplet ejector assembly and the CMOS control circuit thereon, the CMOS control circuit actuates the piezoelectric actuators, causing droplet ejection, by switching the voltage applied to one or more of the electrodes of each piezoelectric actuator, for example between ground and a fixed voltage, or between multiple fixed voltage levels, one or more of which may be ground. In this case, the flexible connector 138 contains one or more electrical conductors carrying a fixed voltage from the machine controller to the droplet ejector chip.

The invention claimed is:

1. A droplet ejector assembly for a printhead, the droplet ejector assembly comprising: a substrate having a first surface and an opposite second surface; the substrate comprising a CMOS control circuit; a plurality of layers on the first surface of the substrate; a fluid chamber having a droplet ejection outlet; and a piezoelectric actuator element formed by one or more said layers and comprising a piezoelectric body and first and second electrodes in contact with the piezoelectric body, the piezoelectric actuator element defining part of the fluid chamber, at least one said electrode electrically connected to the CMOS control circuit, wherein the piezoelectric actuator element is separate to the droplet ejection outlet and the piezoelectric body is formed of one or more piezoelectric materials processable at a temperature below 450° C., and the piezoelectric body has a breakdown voltage of greater than 100V/μm and the CMOS control circuit is configured to apply a potential gradient of greater than 100V/μm within the piezoelectric body.

2. A droplet ejector assembly according to claim 1, wherein the piezoelectric body comprises one or more non-ferroelectric piezoelectric materials and the CMOS control circuit is configured to actuate the piezoelectric body by applying an electrical potential gradient to the piezoelectric body in a first direction to cause the piezoelectric body to flex in a first sense and then to apply an electrical potential gradient to the piezoelectric body in the opposite direction to cause it to deform in an opposite second sense.

3. A droplet ejector assembly according to claim 1, wherein the piezoelectric body has a relative permittivity, $\varepsilon_r$, of less than 100.

4. A droplet ejector assembly according to claim 1, wherein the CMOS control circuit comprises one or more of: (a) a digital register, (b) a nozzle trimming calculation circuit and/or register, (c) a temperature measurement circuit, (d) a fluid chamber fill detection circuit.

5. A droplet ejector assembly according to claim 1, wherein the CMOS control circuit comprises an ejection transistor.

6. A droplet ejector assembly according to claim 1, comprising an electrical input for receiving actuator drive pulses, and wherein the CMOS control circuits is configured to switchedly connect or disconnect at least one electrode of the or each piezoelectric actuator to the received actuator drive pulses to thereby selectively actuate the piezoelectric actuators.

7. An inkjet printer comprising a controller and one or more droplet ejector assemblies according to claim 6 in electronic communication with and controlled by the controller, wherein the controller further comprises a pulse generator configured to generate a sequence of actuator drive pulses and the electrical input of the droplet ejector assembly receives actuator drive pulses through an electrical connection to the controller, and wherein the CMOS control circuit of the one or more droplet ejector assemblies is configured to switchedly connect or disconnect at least one electrode of the or each of a plurality of piezoelectric actuators to the received actuator drive pulses to thereby selectively actuate the piezoelectric actuators.

8. An inkjet printer according to claim 7, comprising a plurality of droplet ejector assemblies, wherein pulses from the pulse generator are conducted to a plurality of control circuits which are part of a plurality of droplet ejector assemblies, wherein the controller is further configured to generate digital control signals which are conducted to the droplet ejector assemblies and which are processed in the CMOS control circuits of the droplet ejector assemblies to determine which actuator drive pulses are conducted to at least one electrode of the piezoelectric actuators of the one or more droplet ejector assemblies to cause droplet ejection.

9. A droplet ejector assembly according to claim 1, wherein the CMOS control circuit is configured to individually and selectively actuate at least three said piezoelectric actuator elements formed by one or more said layers on the same substrate and defining part of different respective fluid chambers and droplet ejection outlets.

10. A droplet ejector assembly according to claim 9, wherein the said at least three actuator elements are located on the substrate and the CMOS control circuit is connected to a flexible printhead cable having one or more electrical signal conductors, wherein the CMOS control circuit is configured to individually and selectively actuate the actuator elements of the at least three actuator elements responsive to actuation commands received through the same signal conductor.

11. A droplet ejector assembly according to claim 9, wherein the CMOS control circuit is configured to individually and selectively actuate at least double the number of piezoelectric actuator elements than signal conductors through which the CMOS control circuit receives actuation control signals.

12. A droplet ejector assembly according to claim 9, further comprising a fluid supply block in contact with one or more of the said layers and defining at least three separate fluid supply manifolds for supplying fluid of different colors or compositions of liquid to different said fluid chambers.

13. A droplet ejector assembly according to claim 12, wherein the fluid supply manifolds comprise a fluid conduit which is connected to each of a plurality of fluid chambers, to supply fluid of the same composition to each of the plurality of fluid chambers, wherein the piezoelectric actuator elements which define part of each of the plurality of fluid chambers are actuated by the CMOS control circuit, optionally responsive to actuation commands received through the same signal conductor.

14. A droplet ejector assembly according to claim 1 wherein the CMOS control circuit is configured to switchedly connect one or more of ground and a single fixed non-zero voltage line, or multiple fixed voltage lines of different voltages, one or more of which may be ground, to one or more both electrodes of a piezoelectric actuator to cause droplet ejection.

15. A method of operating a droplet ejector assembly according to claim 14, wherein the CMOS control circuit receives digital actuation control signals and processes the digital actuation control signals to selectively actuate the piezoelectric actuator element to cause droplet ejection.

16. A method according to claim 15, comprising the step of generating actuator drive pulses and conducting them to the droplet ejector assembly through an electrical connection, and switchedly connecting or disconnecting at least one electrode of the or each of a plurality of piezoelectric actuators to the received actuator drive pulses to thereby selectively actuate the piezoelectric actuators.

17. A method according to claim 15 comprising generating a plurality of different sequences of actuator drive pulses and conducting them to the droplet ejector assembly through separate electrical connections, and switchedly connecting or disconnecting at least one electrode of the or each of a plurality of piezoelectric actuators to one or more received actuator drive pulses received from a variable one of the plurality of different sequences of actuator drive pulses.

18. A method according to claim 15, comprise switching an electrode between a connection to ground and a connection to a fixed voltage or multiple fixed voltage lines of different voltages and back to ground again in order to cause a droplet ejection.

19. A droplet ejector according to claim 1, wherein the CMOS control circuit is configured to modify the voltage pulses applied to one or more electrodes of one or more piezoelectric actuators responsive to data stored by the CMOS control circuit or measurements from one or more sensors: which are typically within the droplet ejector assembly.

20. A method of manufacturing a droplet ejector assembly for a droplet ejector according to claim 1, the method comprising: providing a substrate having a first surface, forming the CMOS control circuit on the first surface, forming the plurality of layers on the first surface, the plurality of layers comprising the piezoelectric actuator element comprising the first and second electrodes and the piezoelectric body.

21. A droplet ejector assembly for a printhead, the droplet ejector assembly comprising: a substrate having a first surface and an opposite second surface, the substrate comprising a CMOS control circuit; a plurality of layers on the first surface of the substrate; a fluid chamber having a droplet ejection outlet; and a piezoelectric actuator element formed by one or more said layers and comprising a piezoelectric body and first and second electrodes in contact with the piezoelectric body, the piezoelectric actuator element defining part of the fluid chamber, at least one said electrode electrically connected to the CMOS control circuit, wherein the piezoelectric body is formed of one or more piezoelectric materials processable at a temperature below 450° C., and the piezoelectric body has a breakdown voltage of greater than 100V/μm and the CMOS control circuit is configured to apply a potential gradient of greater than 100V/μm within the piezoelectric body.

22. A droplet ejector assembly according to claim 21, comprising an electrical input for receiving actuator drive pulses, and wherein the CMOS control circuits are configured to switchedly connect or disconnect at least one electrode of the or each piezoelectric actuator to the received actuator drive pulses to thereby selectively actuate the piezoelectric actuators, or wherein the CMOS control circuit is configured to switchedly connect one or more of ground and a single fixed non-zero voltage line, or multiple fixed voltage lines of different voltages, one or more of which may be ground, to one or more both electrodes of a piezoelectric actuator to cause droplet ejection.

23. An inkjet printer comprising a controller and one or more droplet ejector assemblies according to claim 21 in electronic communication with and controlled by the controller, wherein the controller further comprises a pulse generator configured to generate a sequence of actuator drive pulses and the electrical input of the droplet ejector assembly receives actuator drive pulses through an electrical connection to the controller, and wherein the CMOS control circuit of the one or more droplet ejector assemblies is configured to switchedly connect or disconnect at least one electrode of the or each of a plurality of piezoelectric actuators to the received actuator drive pulses to thereby selectively actuate the piezoelectric actuators.

* * * * *